United States Patent
Muhammad et al.

(10) Patent No.: US 12,089,276 B2
(45) Date of Patent: Sep. 10, 2024

(54) ALTERNATE PATH INFORMATION EXCHANGE FOR BETTER SCHEDULING AND BACKHAUL FAILURE RECOVERY IN INTEGRATED ACCESS BACKHAUL NETWORKS

(71) Applicant: Telefonaktiebolaget LM Ericsson (publ), Stockholm (SE)

(72) Inventors: Ajmal Muhammad, Sollentuna (SE); Oumer Teyeb, Montreal (CA); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 281 days.

(21) Appl. No.: 17/430,492

(22) PCT Filed: Feb. 12, 2020

(86) PCT No.: PCT/EP2020/053643
§ 371 (c)(1),
(2) Date: Aug. 12, 2021

(87) PCT Pub. No.: WO2020/165280
PCT Pub. Date: Aug. 20, 2020

(65) Prior Publication Data
US 2022/0151006 A1 May 12, 2022

Related U.S. Application Data

(60) Provisional application No. 62/805,018, filed on Feb. 13, 2019.

(51) Int. Cl.
*H04W 76/19* (2018.01)
*H04W 28/086* (2023.01)
(Continued)

(52) U.S. Cl.
CPC ....... *H04W 76/19* (2018.02); *H04W 28/0862* (2023.05); *H04W 76/20* (2018.02); *H04W 88/14* (2013.01)

(58) Field of Classification Search
CPC . H04W 76/19; H04W 28/0862; H04W 76/20; H04W 88/14; H04W 40/14;
(Continued)

(56) References Cited

U.S. PATENT DOCUMENTS

2020/0128539 A1* 4/2020 Abedini ................ H04W 72/23

OTHER PUBLICATIONS

Intel Corporation, IAB route adaptation upon RLF, 3GPP TSG RAN WG3 Meeting #101bis, Chengdu, China, Oct. 8-12, 2018, R3-185686. (Year: 2018).*

(Continued)

*Primary Examiner* — Shailendra Kumar
(74) *Attorney, Agent, or Firm* — Weisberg I.P. Law, P.A.

(57) ABSTRACT

A method and apparatus are disclosed for using alternate paths for descendant nodes for backhaul failure link reporting. In one embodiment, a method for a network node that may be a parent node includes receiving information indicating at least one alternate path of at least one child IAB node to an IAB donor node, the at least one child IAB node being a wireless backhaul node; and using the received information to perform at least one of a backhaul wireless link failure recovery and load balancing of traffic. In another embodiment, a method for a network node that may be a child node includes receiving information indicating at least one alternate path of a parent IAB node to an IAB donor node, the parent IAB node being a wireless backhaul node for the child IAB node. The received information is used to perform at least one operational task.

16 Claims, 20 Drawing Sheets

(51) Int. Cl.
*H04W 76/20* (2018.01)
*H04W 88/14* (2009.01)

(58) Field of Classification Search
CPC ........ H04W 40/22; H04L 45/12; H04L 45/22; H04L 45/28
See application file for complete search history.

(56) References Cited

OTHER PUBLICATIONS

Vivo, Selection of Parent for IAB-Node, 3GPP TSG-RAN WG2 Meeting #104, Spokane, USA, Nov. 12-16, 2018, R2-1816509. (Year: 2018).*
OMESH Networks, Use of multi-connectivity for load balancing and reliability in IAB, 3GPP TSG-RAN WG3 #101bis, Chengdu, China, Oct. 8-12, 2018, R3-185402. (Year: 2018).*
Sony, Route management in IAB, 3GPP TSG RAN WG2 Meeting #102, Busan, Korea, May 21-25, 2018, R2-1807784. (Year: 2018).*
Futurewei, Remaining Issues for IAB Routing, 3GPP TSG-RAN WG2 meeting #108, Reno, Nevada, USA Nov. 18-22, 2019, R2-1914514. (Year: 2018).*
International Search Report and Written Opinion dated May 7, 2020 for International Application No. PCT/EP2020/053643 filed Feb. 12, 2020, consisting of 18-pages.
3GPP TSG RAN WG2 Meeting #102 R2-1807784; Title: Route management in IAB; Agenda Item: 11.1.3; Source: Sony; Document for: Discussion; Date and Location: May 21-25, 2018, Busan, Korea, consisting of 3-pages.

3GPP-TSG RAN WG2 Meeting #104 R2-1816509 Resubmission of R2-1815517; Title: Selection of Parent for IAB-Node; Agenda Item: 11.1.3; Source: vivo; Document for: Discussion and Decision; Date and Location: Nov. 12-16, 2018, Spokane, USA, consisting of 3-pages.
3GPP TSG-RAN WG3 Meeting #103 R3-19xxxx; Title: IAB baseline for 38.401; Agenda Item: 13.1; Source: Qualcomm Incorporated; Document for: Discussion; Date and Location: Feb. 15-Mar. 1, 2019, Athens, Greece, consisting of 16-pages.
3GPP TSG-RAN WG3 #101bis R3-185402; Title: Use of multi-connectivity for load balancing and reliability in IAB; Agenda Item: 24.2; Source: OMESH Networks; Document for: Approval; Date and Location: Oct. 8-12, 2018, Chengdu, China, consisting of 6-pages.
3GPP TSG RAN WG3 Meeting #101bis R3-185686; Title: IAB route adaptation upon RLF; Agenda Item: 24.2; Source: Intel Corporation; Document for: Discussion and Decision; Date and Location: Oct. 8-12, 2018, Chengdu, China, consisting of 5-pages.
3GPP TSG-RAN WG2 meeting #108 R2-1914514 (revision of R2-1913538); Title: Remaining Issues for IAB Routing; Agenda Item: 6.1.3.1; Source: Futurewei; Document for: Discussion and Decision; Date and Location: Nov. 18-22, 2019, Reno, Nevada, USA, consisting of 7-pages.
3GPP TR 38.874 V0.7.0; 3rd Generation Partnership Project; Technical Specification Group Radio Access Network; Study on Integrated Access and Backhaul; (Release 15), Nov. 2018, consisting of 111-pages.

* cited by examiner

ALTERNATE PATH INFORMATION EXCHANGE FOR BETTER SCHEDULING AND BACKHAUL FAILURE RECOVERY IN INTEGRATED ACCESS BACKHAUL NETWORKS

CROSS-REFERENCE TO RELATED APPLICATIONS

This application is a Submission Under 35 U.S.C. § 371 for U.S. National Stage Patent Application of International Application No.: PCT/EP2020/053643, filed Feb. 12, 2020 entitled "ALTERNATE PATH INFORMATION EXCHANGE FOR BETTER SCHEDULING AND BACKHAUL FAILURE RECOVERY IN INTEGRATED ACCESS BACKHAUL NETWORKS," which claims priority to U.S. Provisional Application No. 62/805,018, filed Feb. 13, 2019, entitled "ALTERNATE PATH INFORMATION EXCHANGE FOR BETTER SCHEDULING AND BACKHAUL FAILURE RECOVERY IN INTEGRATED ACCESS BACKHAUL NETWORKS," the entireties of both of which are incorporated herein by reference.

TECHNICAL FIELD

The present disclosure relates to wireless communications, and in particular, to alternative paths of descendant nodes for backhaul-link failure reporting in integrated access.

BACKGROUND

Integrated Access Backhaul Networks

The Third Generation Partnership Project (3GPP) is studying potential solutions for efficient operation of integrated access and wireless access backhaul in New Radio (NR) (NR is also known as "5G"), referred to as the Integrated Access Backhaul (IAB) network.

IAB generally strives to reuse existing functions and interfaces defined for access. In particular, Mobile-Termination (MT), gNode B distributed unit (gNB-DU), gNB-Central Unit (CU), User Plane Function (UPF), Access and Mobility Management Function (AMF) and Session Management Function (SMF) as well as the corresponding interfaces NR Uu (between MT and gNB), F1, NG, X2 and N4, are used as baselines for the IAB architectures. Modifications or enhancements to these functions and interfaces for the support of IAB will be explained in the context of the architecture discussion. Additional functionality such as multi-hop forwarding is included in the architecture discussion as it may be helpful for the understanding of IAB operation and since certain aspects may require standardization.

The Mobile-Termination (MT) function has been defined as a component of the Mobile Equipment. In the context of this study, MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor is treated as a single logical node that includes a set of functions such as gNB-DU, gNB-CU-Control Plane (CP), gNB-CU-User Plane (UP) and potentially other functions. In a deployment, the IAB-donor can be split according to these functions, which can all be either collocated or non-collocated as allowed by 3GPP Next Generation Radio Access Network (NG-RAN) architecture. IAB-related issues may arise when such split is exercised. Also, some of the functions presently associated with the IAB-donor may eventually be moved outside of the donor in case it becomes evident that they do not perform IAB-specific tasks.

Few potential architectures to implement IAB have been identified (the reader is referred to 3GPP Technical Report (TR) 38.874 for the details of these architectures). These architectures are shown in FIGS. 2-6. Architectures 1a, 1b, 2a, 2b and 2c are shown in FIGS. 2-6, respectively. After analyzing the differences between these options during the study item phase of IAB specifications, the 3GPP has decided to standardize architecture 1a for technical 3GPP release-16. An example of the proposed UP and CP protocol stacks is shown in FIGS. 7 and 8.

As shown in FIGS. 7 and 8, the proposed protocol stacks reuse the current CU-DU split specification in 3GPP Release-15, where the full F1-U (General Packet Radio Service Tunneling Protocol (GTP)-U/user datagram protocol (UDP)/Internet protocol (IP)) is terminated at the IAB node (like a normal distributed unit (DU)) and the full F1-C (F1-application protocol (AP)/stream transmission control protocol (SCTP)/IP) is also terminated at the IAB node (like a normal DU). In the above cases, Network Domain Security (NDS) has been employed to protect both user plane (UP) and control plane (CP) traffic (IPsec in the case of UP, and datagram transport layer security (DTLS) in the case of CP). IPsec could also be used for the CP protection instead of DTLS.

One commonality between the CP and UP protocol stacks is that a new layer, called an adaptation layer, has been introduced in the intermediate IAB nodes and the IAB donor, which is used for routing of packets to the appropriate downstream/upstream node. The adaptation layer is also used for mapping the user equipment (UE) bearer data to the proper backhaul radio link control (RLC) channel (and also between backhaul radio link control (RLC) channels in intermediate IAB nodes) to satisfy the end to end quality of service (QoS) requirements of bearers.

Some examples of the operation of the transmitter and receiver side follow.

Packet Data Convergence Protocol (PDCP)

The PDCP entity receives PDCP service data units (SDUs) from higher layers and these SDUs are assigned a Sequence Number (SN) and delivered to lower layers (i.e., RLC). The discard timer is also started at the time a PDCP SDU is received. When the discard timer expires, the PDCP SDU is discarded and a discard indication is sent to lower layers. RLC, when possible, will then discard the RLC SDU.

In the receiver side, the PDCP entity starts the t-reordering when it receives packets that are out of order. When the t-reordering expires, the PDCP entity updates the variable RX_DELIV which indicates the value of the first PDCP SDU not delivered to the upper layers i.e., it indicates the lower side of the receiving window.

Radio Link Control (RLC)

In the transmitter side, when an RLC SDU is received from higher layers, a sequence number (SN) is associated to it. The transmitter may set the poll bit to request the receiver side to transmit a status report. When this is done, the t-poll Retransmit is started. Upon expiration of this timer, the transmitter will again set the poll bit and may further retransmit those packet data units (PDUs) which were waiting to be acknowledged.

The receiver, on the other hand, will start the t-reassembly when RLC PDUs are not received in sequence. The function is similar to the t-reordering in PDCP. The timer is started when there is an SN gap, i.e., an RLC PDU is missing. When t-reassembly expires, for acknowledge mode (AM), the receiver will transmit a status report to trigger a retransmission in the transmitter side.

Media Access Control (MAC)

When the UE has data to be transmitted, it will request a grant by means of the scheduling request (SR) or buffer status report (BSR).

Backhaul Link Failure

Backhaul Link Failure Recovery Scenarios

For various reasons, different scenarios of backhaul-link failure may occur in IAB networks. In the following, some example scenarios are illustrated for backhaul-link failure. Examples of such scenarios are depicted with illustrative figures (FIGS. 9-11) aimed at establishing a route between IAB-donor and IAB-node D after back haul (BH)-link failure, where:

Nodes A1 and A2 are IAB-donor nodes; nodes B to H are IAB-nodes;

The thin dashed lines represent the established connection between two nodes;

The arrows represent the established route after BH-link failure, and the thick dashed line represents the new established connection.

Scenario A

In this scenario (depicted in FIG. 9), the backhaul-link failure occurs between an upstream IAB-node (e.g., IAB-node C) and one of its parent IAB-nodes (e.g., IAB-node B), where the upstream IAB-node (IAB-node C) has an additional link established to another parent node (IAB-node E).

Scenario B

In this scenario (depicted in FIG. 10), the backhaul-link failure occurs between an upstream IAB-node (e.g. IAB-node C) and all its parent IAB-nodes (e.g., IAB-nodes B and E). The upstream IAB-node (IAB-node C) has to reconnect to a new parent node (e.g., IAB-node F), and the connection between IAB-node F and IAB-node C is newly established).

Scenario C

In this scenario (depicted in FIG. 11), the backhaul-link failure occurs between IAB-node C and IAB-node D. IAB-node D has to reconnect to the new IAB-donor (e.g., IAB-donor A2) via a new route.

Principal Steps of BH RLF Recovery in Architecture 1*a*

In the following discussion, three scenarios of backhaul radio link failure (RLF) and subsequent recovery are discussed:

Scenario 1: Recovery via an existing BH link (FIGS. 12 and 13).

Scenario 2: Recovery via a newly established BH link using the same IAB-donor CU (FIGS. 14 and 15).

Scenario 3: Recovery via a newly established BH link using a different IAB-donor CU (FIGS. 16 and 17).

In scenario 1 (FIGS. 12 and 13), the MT on IAB-node-5 is dual-connected to IAB-node-3 and IAB-node-4, which hold the master cell group (MCG) and the secondary cell group (SCG), respectively. Two adaptation layer routes have been established, one referred to as Adapt route A via IAB-node-3, and the other referred to as Adapt route B via IAB-node 4. It is assumed that Adapt route A is used for backhauling of access traffic for the UE attached to IAB-node-5. The radio link failure (RLF) is further assumed to occur on the link to the MCG on IAB-node-3. The SCG link to IAB-node-5 may further be in a radio resource control (RRC)-inactive state.

FIG. 13 shows one example for the recovery procedure for scenario 1, which may include the following steps:

1. The MT on IAB-node-5 conducts radio link monitoring (RLM) on both links and discovers RLF on the link to MCG on IAB-node-3.
2. The MT may report MCG RLF over SCG radio resource control (RRC) to the CU-CP using NR dual connectivity (DC) procedures. This step implies that such reporting is supported by NR DC. In case the SCG link is in RRC inactive state, the MT will resume the RRC connection on this link.
3. The CU-CP migrates the MT's MCG from IAB-node-3 to IAB-node-4 using NR DC procedures. This step implies that such procedure is supported by NR DC.
B. The CU-CP migrates the F1*-U connection with the distributed unit (DU) on IAB-node-5 to Adapt route B. It further uses Adapt route B for F1*-C signaling with the DU on IAB-node-5. This step also has to be applied to all descendent IAB-nodes of IAB-node-5.
C. The CU-CP may release Adapt route A.

After backhaul (BH) RLF recovery, the CU-CP can add topologically redundant BH links and routes. Note that while the Scenario 1 recovery procedure is presented for the case of multi-connectivity of single-MT IAB-nodes, it may be expected that a similar solution is applicable to the case of multi-connected multi-MT IAB-nodes.

In scenario 2 (FIGS. 14 and 15), the MT on IAB-node-5 is singly connected to IAB-node-3. One adaptation layer route has been established via IAB-node-3 referred to as Adapt route A. The RLF is assumed to occur on the link between IAB-node-5 and its parent node IAB-node-3.

FIG. 15 shows one example of the recovery procedure for scenario 2, which may include the following steps:

1. The MT on IAB-node-5 conducts RLM on the link to its parent and discovers the RLF.
2. The MT on IAB-node-5 synchronizes with the DU on IAB-node-4 and performs a random access channel (RACH) procedure.
3. The MT on IAB-node-5 initiates RRC-Connection-Reestablishment, leveraging existing NR procedures. Since the central unit (CU) is the same as before, it has all the context of this MT. IAB-node-5 discovers that the CU has not changed through a CU-specific identifier provided to the MT. Consequently, IAB-node-5's DU can keep the existing F1-application protocol (AP) with the CU.
A. The CU-CP establishes Adapt route B to IAB-node-5 via IAB-donor DU2, IAB-node-2 and IAB-node-4.
B. The CU-CP migrates F1*-U with the DU on IAB-node-5 to Adapt route B. It further uses Adapt route B for F1*-C signaling with the DU on IAB-node-5. This step also should be applied to all descendent IAB-nodes of IAB-node-5.
C. The CU-CP may release Adapt route A.

After BH RLF recovery, the CU-CP can add topologically redundant BH links and routes.

In scenario 3 (FIGS. 16 and 17), the MT on IAB-node-5 is single-connected to IAB-node-3. One adaptation layer route has been established via IAB-node-3 referred to as Adapt route A. The RLF is assumed to occur on the link between IAB-node-5 and its parent node IAB-node-3.

FIG. 17 shows one example for the recovery procedure for scenario 3, which may include the following steps:

1. The MT on IAB-node-5 conducts RLM on the link to its parent and discovers RLF.

2. The MT on IAB-node-5 synchronizes with the DU on IAB-node-4 and performs a random access channel (RACH) procedure.
3. The DU on IAB-node-5 discontinues service since it has lost F1*-C connectivity to gNB-CU-1.
4. The MT on IAB-node-5 initiates RRC-Connection-Reestablishment, leveraging existing NR procedures. Since the CU is different, it may or may not be able to fetch the context of this MT. IAB-node-5 discovers that the CU has changed from a CU-specific identifier provided to the MT. Consequently, IAB-node-5 has to restart F1-AP from its DU to the new CU.
A. The new CU-CP establishes Adapt route B to IAB-node-5 via IAB-donor DU2, IAB-node-2 and IAB-node-4.
B. The DU on IAB-node-5 initiates a new F1*-C connection to the new CU-CP. This procedure is the same as IAB-node setup phase 2.2 described in section 9.3 of 3GPP Technical Report (TR) 38.874. The DU will obtain a new configuration during that procedure, e.g., a new physical cell identity (PCI). After that, the DU resumes service.
5. The UE determines RLF with the prior DU entity on IAB-node-5.
6. The UE discovers and selects the new DU entity on IAB-node-5.
7. The UE conducts a random access procedure with this new DU entity on IAB-node-5.
8. The UE initiates RRC-Connection-Reestablishment with the new CU-CP, leveraging NR procedures. The new CU-CP may or may not be able to fetch the UE's context from the old CU-CP. The new CU-CP will set up F1*-U for the UE with the new DU on IAB-node-5 following NR procedures.
C. The CU-CP releases Adapt route A. This release may be based on F1*-C failure detection.

After BH RLF recovery, the CU-CP can add topologically redundant BH links and routes.

Steps 3, 4, A, B, C and potentially steps 1 and 2 also may have to be applied by all descendant IAB-nodes of IAB-node-5. Further, steps 4, 5 and 6 may also be applied by all UEs connected to descendant IAB-nodes of IAB-node-5.

As these steps show, the BH RLF recovery procedure via a new backhaul link with a different CU may cause multiple subsequent RLFs for descendant IAB-nodes and UEs. This may cause long service interruption for UEs. Further enhancements may be useful to reduce this service interruption.

SUMMARY

Some embodiments advantageously provide methods and apparatuses for using alternate paths for backhaul link failure reporting.

According to one aspect of the present disclosure, a method for a network node that may be a parent node includes receiving information indicating at least one alternate path of at least one child node to a donor node; and using the received information to perform at least one operational task.

According to one aspect of the present disclosure, a method for a network node that may be a child node includes receiving information indicating at least one alternate path of the network node to a donor node; and using the received information to perform at least one operational task.

According to an aspect of the present disclosure, a method implemented in an Integrated Access Backhaul, IAB, node is provided. The method includes receiving information indicating at least one alternate path of at least one child IAB node to an IAB donor node, the at least one child IAB node being a wireless backhaul node. The method includes using the received information to perform at least one of a backhaul wireless link failure recovery and load balancing of traffic.

In some embodiments of this aspect, using the receiving information to perform the at least one of the backhaul wireless link failure recovery and the load balancing of traffic further includes using the received information to perform the backhaul wireless link failure recovery by informing a child IAB node that has an alternate path to start routing all uplink data via the alternate path. In some embodiments of this aspect, using the receiving information to perform the at least one of the backhaul wireless link failure recovery and the load balancing of traffic further includes using the received information to perform the load balancing of traffic by at least one of prioritizing traffic from each of the at least one child IAB node and load balancing of traffic for each of the at least one child IAB node. In some embodiments of this aspect, the information indicates only alternative paths of the at least one child IAB node to the IAB donor node that do not traverse the IAB node.

In some embodiments of this aspect, the received information indicates at least one of: a number of alternate parent IAB nodes; for each of the at least one alternate path, a number of hops to reach the IAB donor node via the at least one alternate path; for each of the at least one alternate path, whether the alternative path is one of an active path or a fallback path; traffic congestion along each of the at least one alternate path; and for each of the at least one alternate path, whether the alternate path is link disjoint to a path from the IAB node to the IAB donor node. In some embodiments of this aspect, receiving the information indicating the at least one alternate path of the at least one child IAB node to the IAB donor node further includes one of: receiving the information from at least one of the IAB donor node and the at least one child IAB node; receiving the information via radio resource control signaling; receiving the information via F1 signaling; and receiving the information as a result of a request for the information from the IAB node.

According to another aspect of the present disclosure, a method implemented in a child Integrated Access Backhaul, IAB, node is provided. The method includes receiving information indicating at least one alternate path of a parent IAB node to an IAB donor node, the parent IAB node being a wireless backhaul node for the child IAB node. The method includes using the received information to perform at least one operational task.

In some embodiments of this aspect, the at least one operational task includes prioritizing connection establishment of the parent IAB node having a greatest number of paths to the IAB donor node, as compared to other parent IAB nodes of the child IAB node. In some embodiments of this aspect, the at least one operational task includes prioritizing connection establishment of the parent IAB node having a least number of hops to the IAB donor node, as compared to other parent IAB nodes of the child IAB node. In some embodiments of this aspect, the at least one operational task includes performing load balancing of traffic toward parent IAB nodes based on at least one of a number of alternate paths of a parent IAB node to the IAB donor node and a number of hops from the parent IAB node to the IAB donor node.

In some embodiments of this aspect, the information indicates at least one of: a number of intermediate parent IAB nodes of the parent IAB node; alternate paths available through each intermediate parent IAB node; and a number of hops from the parent IAB node to reach the donor IAB node via each of the at least one alternate path. In some embodiments of this aspect, receiving the information indicating the at least one alternate path of the parent IAB node to the IAB donor node further includes one of: receiving the information from at least one of the IAB donor node and the parent IAB node; receiving the information via radio resource control signaling; receiving the information via F1 signaling; and receiving the information from the parent IAB node via broadcast signaling.

According to another aspect of the present disclosure, an Integrated Access Backhaul, IAB, node includes processing circuitry. The processing circuitry is configured to cause the IAB node to receive information indicating at least one alternate path of at least one child IAB node to an IAB donor node, the at least one child IAB node being a wireless backhaul node. The processing circuitry is configured to cause the IAB node to use the received information to perform at least one of a backhaul wireless link failure recovery and load balancing of traffic.

In some embodiments of this aspect, the processing circuitry is further configured to cause the IAB node to use the received information to perform the at least one of the backhaul wireless link failure recovery and the load balancing of traffic by being configured to cause the IAB node to use the received information to perform the backhaul wireless link failure recovery by informing a child IAB node that has an alternate path to start routing all uplink data via the alternate path. In some embodiments of this aspect, the processing circuitry is further configured to cause the IAB node to use the received information to perform the at least one of the backhaul wireless link failure recovery and the load balancing of traffic by being configured to cause the IAB node to use the received information to perform the load balancing of traffic by at least one of prioritizing traffic from each of the at least one child IAB node and load balancing of traffic for each of the at least one child IAB node.

In some embodiments of this aspect, the information indicates only alternative paths of the at least one child IAB node to the IAB donor node that do not traverse the IAB node. In some embodiments of this aspect, the received information indicates at least one of: a number of alternate parent IAB nodes; for each of the at least one alternate path, a number of hops to reach the IAB donor node via the at least one alternate path; for each of the at least one alternate path, whether the alternative path is one of an active path or a fallback path; traffic congestion along each of the at least one alternate path; and for each of the at least one alternate path, whether the alternate path is link disjoint to a path from the IAB node to the IAB donor node.

In some embodiments of this aspect, the processing circuitry is further configured to receive the information indicating the at least one alternate path of the at least one child IAB node to the IAB donor node by being configured to cause the IAB node to one of: receive the information from at least one of the IAB donor node and the at least one child IAB node; receive the information via radio resource control signaling; receive the information via F1 signaling; and receive the information as a result of a request for the information from the IAB node.

According to another aspect of the present disclosure, a child Integrated Access Backhaul, IAB, node includes processing circuitry. The processing circuitry is configured to cause the child IAB node to receive information indicating at least one alternate path of a parent IAB node to an IAB donor node, the parent IAB node being a wireless backhaul node for the child IAB node. The processing circuitry is configured to cause the child IAB node to use the received information to perform at least one operational task.

In some embodiments of this aspect, the processing circuitry is further configured to cause the child IAB node to use the received information to perform the at least one operational task further by being configured to cause the child IAB node to at least one of: prioritize connection establishment of the parent IAB node having a greatest number of paths to the IAB donor node, as compared to other parent IAB nodes of the child IAB node; prioritize connection establishment of the parent IAB node having a least number of hops to the IAB donor node, as compared to other parent IAB nodes of the child IAB node; and perform load balancing of traffic toward parent IAB nodes based on at least one of a number of alternate paths of a parent IAB node to the IAB donor node and a number of hops from the parent IAB node to the IAB donor node.

In some embodiments of this aspect, the information indicates at least one of: a number of intermediate parent IAB nodes of the parent IAB node; alternate paths available through each intermediate parent IAB node; and a number of hops from the parent IAB node to reach the donor IAB node via each of the at least one alternate path. In some embodiments of this aspect, the processing circuitry is further configured to cause the child IAB node to receive the information indicating the at least one alternate path of the parent IAB node to the IAB donor node by being configured to cause the child IAB node to one of: receive the information from at least one of the IAB donor node and the parent IAB node; receive the information via radio resource control signaling; receive the information via F1 signaling; and receive the information from the parent IAB node via broadcast signaling.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Downstream Notification of BH RLF in Architecture 1a

Figure 1:
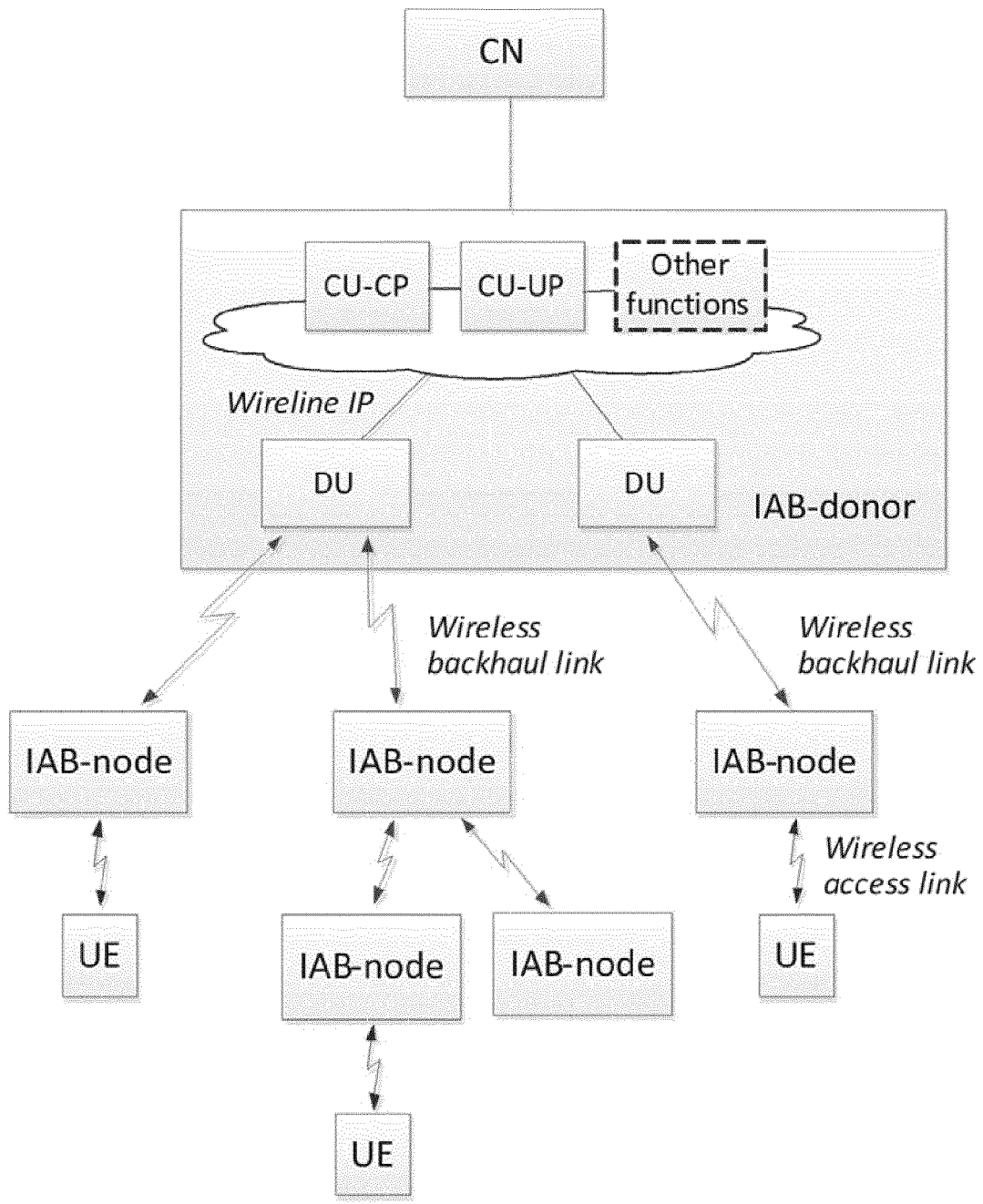
FIG. 1 is a reference diagram for Integrated Access Backhaul (IAB) in a standalone mode.
Figure 2:
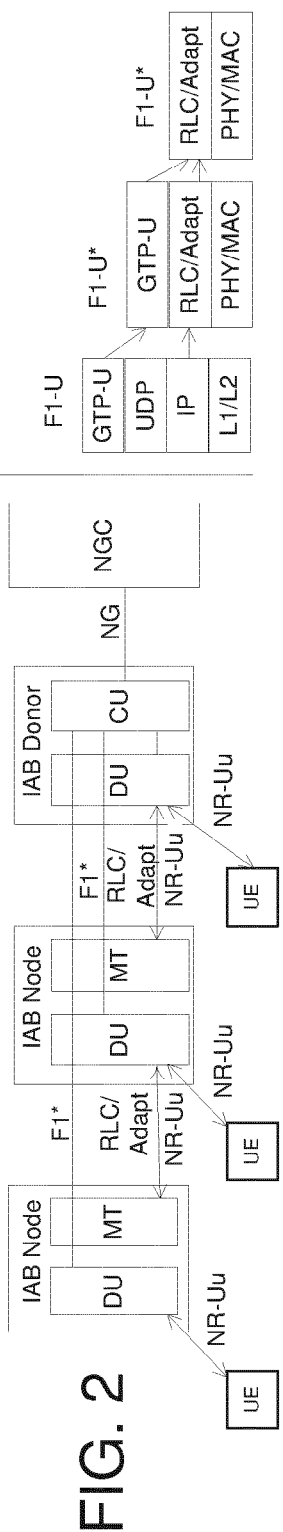
FIGS. 2-6 illustrate architectures to implement IAB identified by the 3GPP.
Figure 3:
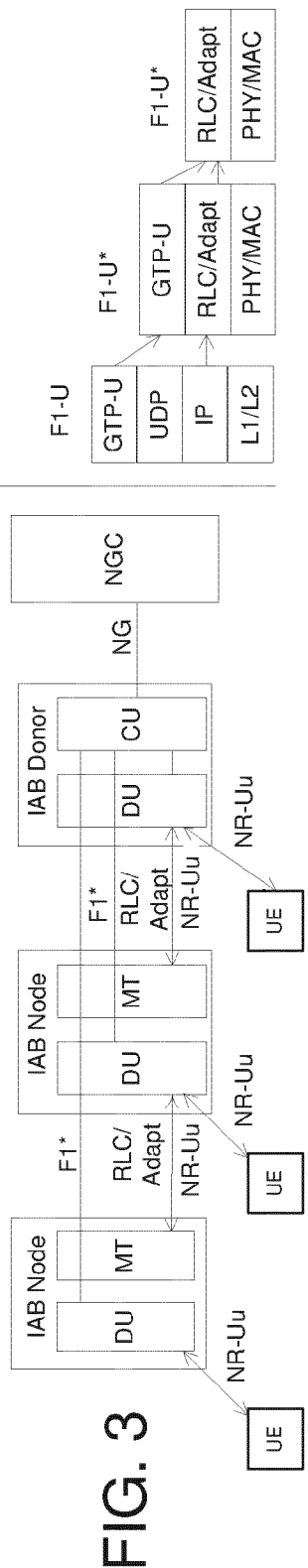
Figure 4:
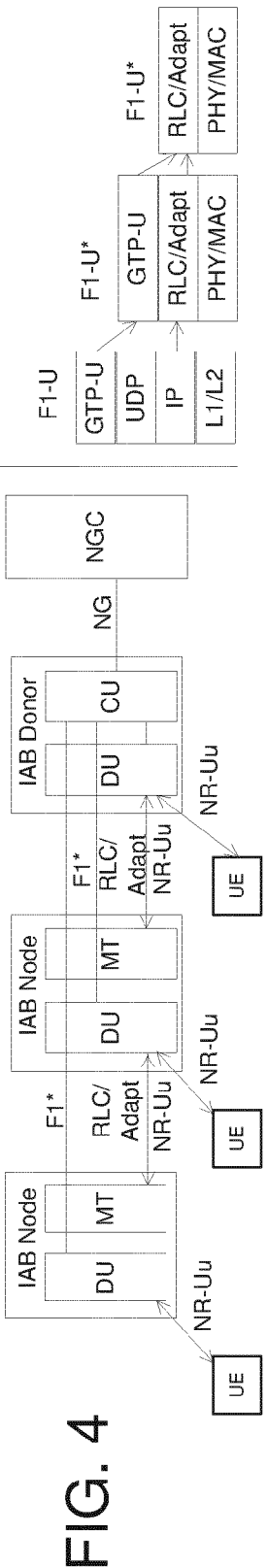
Figure 5:
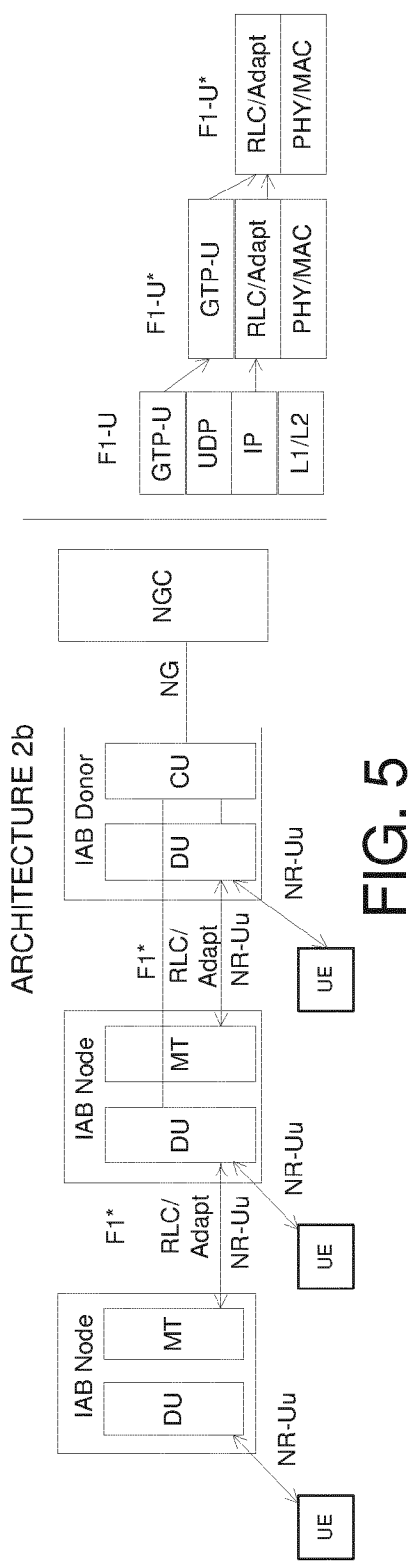
Figure 6:
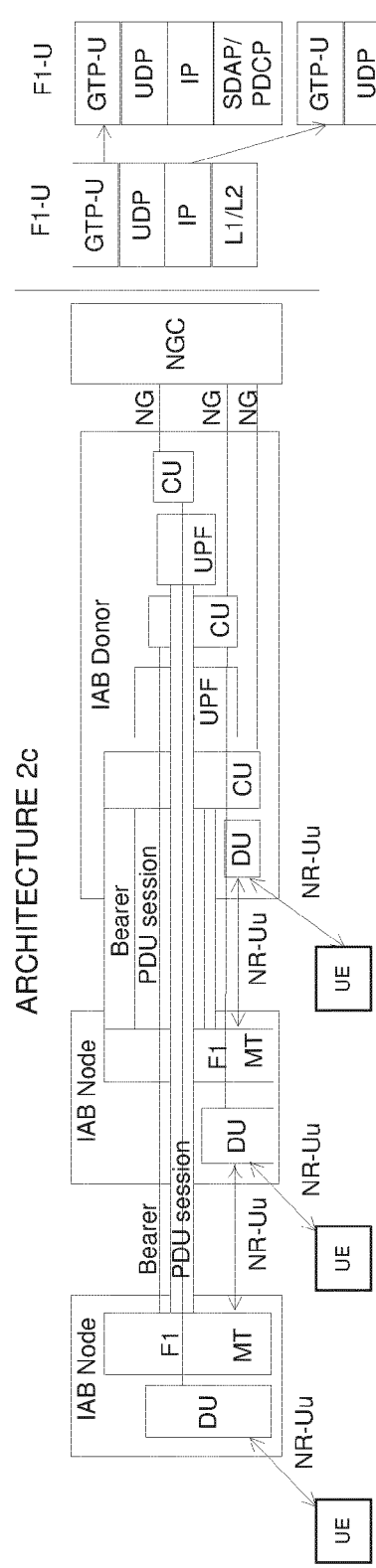
Figure 7:
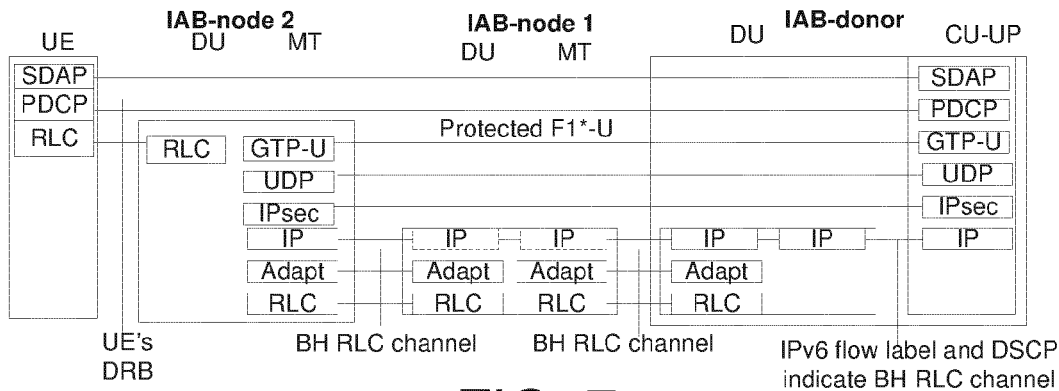
FIGS. 7 and 8 illustrate user plane (UP) and control plane (CP) protocol stacks for the standardized architecture shown in FIG. 2.
Figure 8:
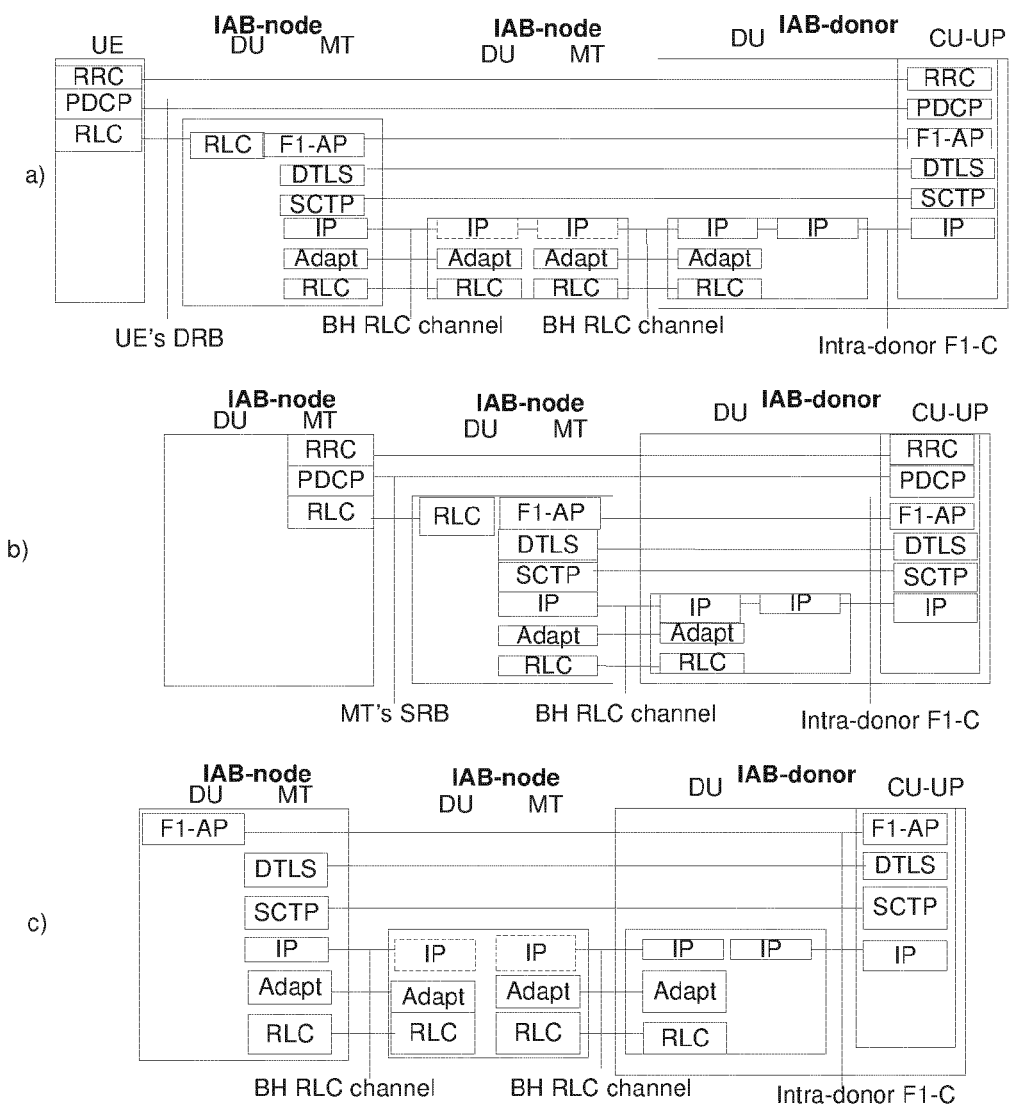
Figure 9:
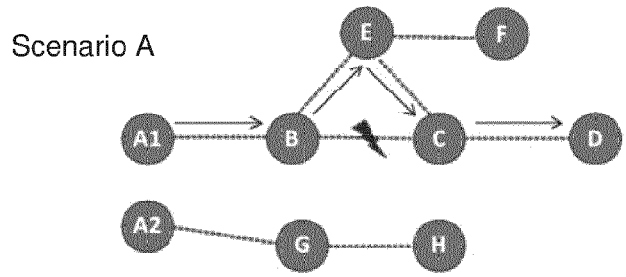
FIGS. 9-11 illustrate scenarios for backhaul (BH) link failure.
Figure 10:
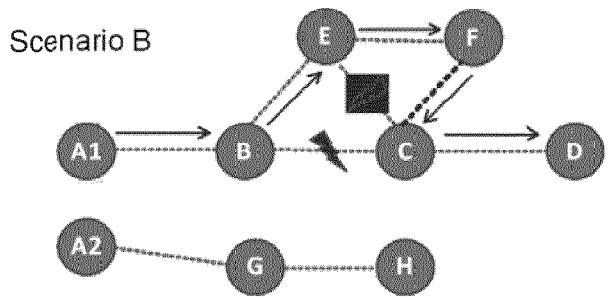
Figure 11:
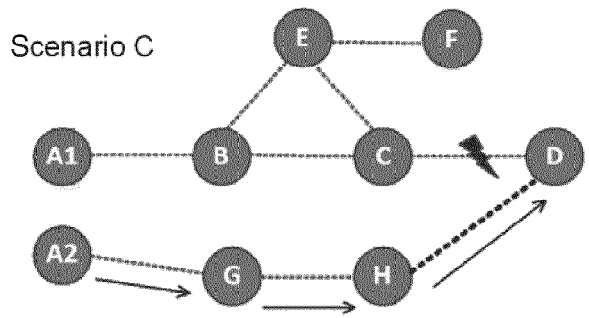
Figure 12:
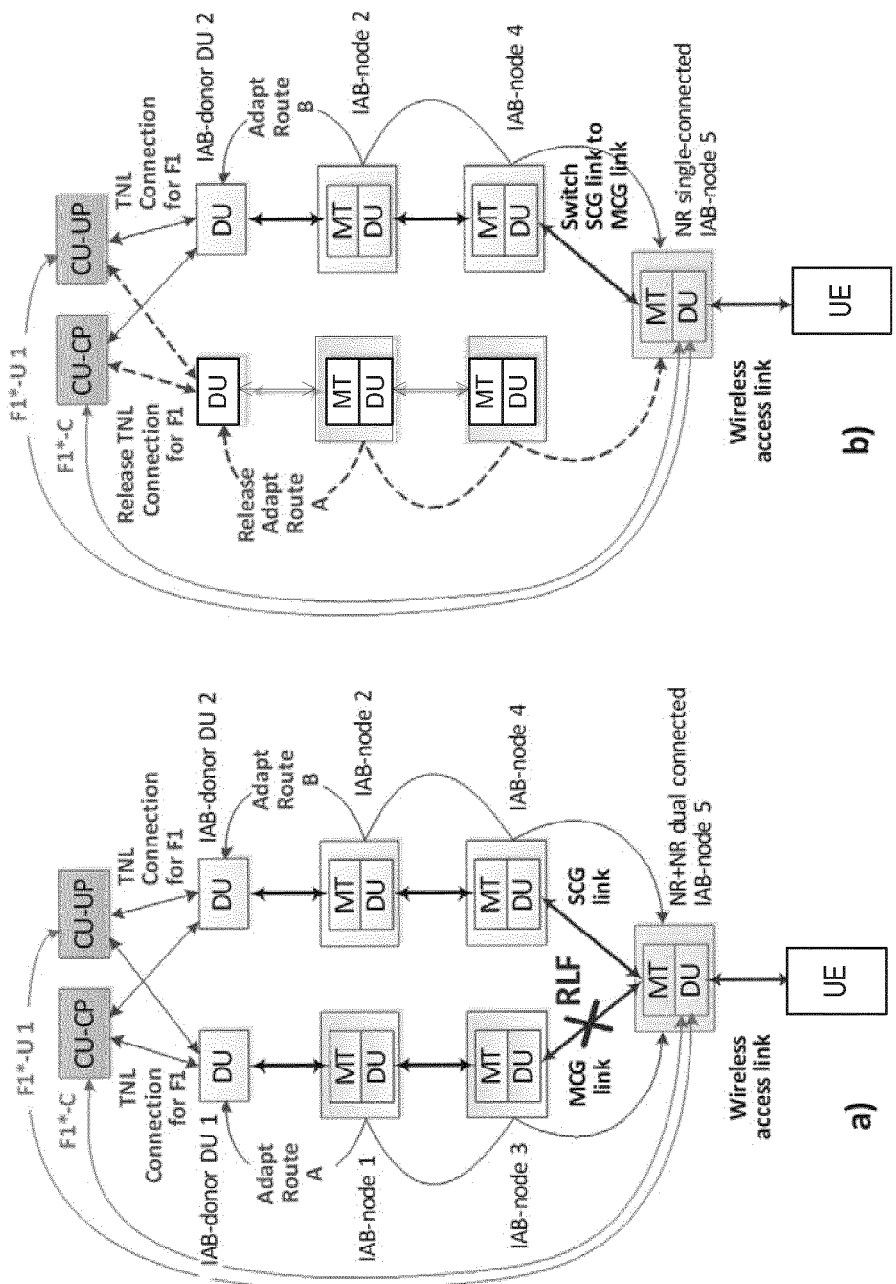
FIGS. 12 and 13 illustrate recovery via an existing BH link.
Figure 13:
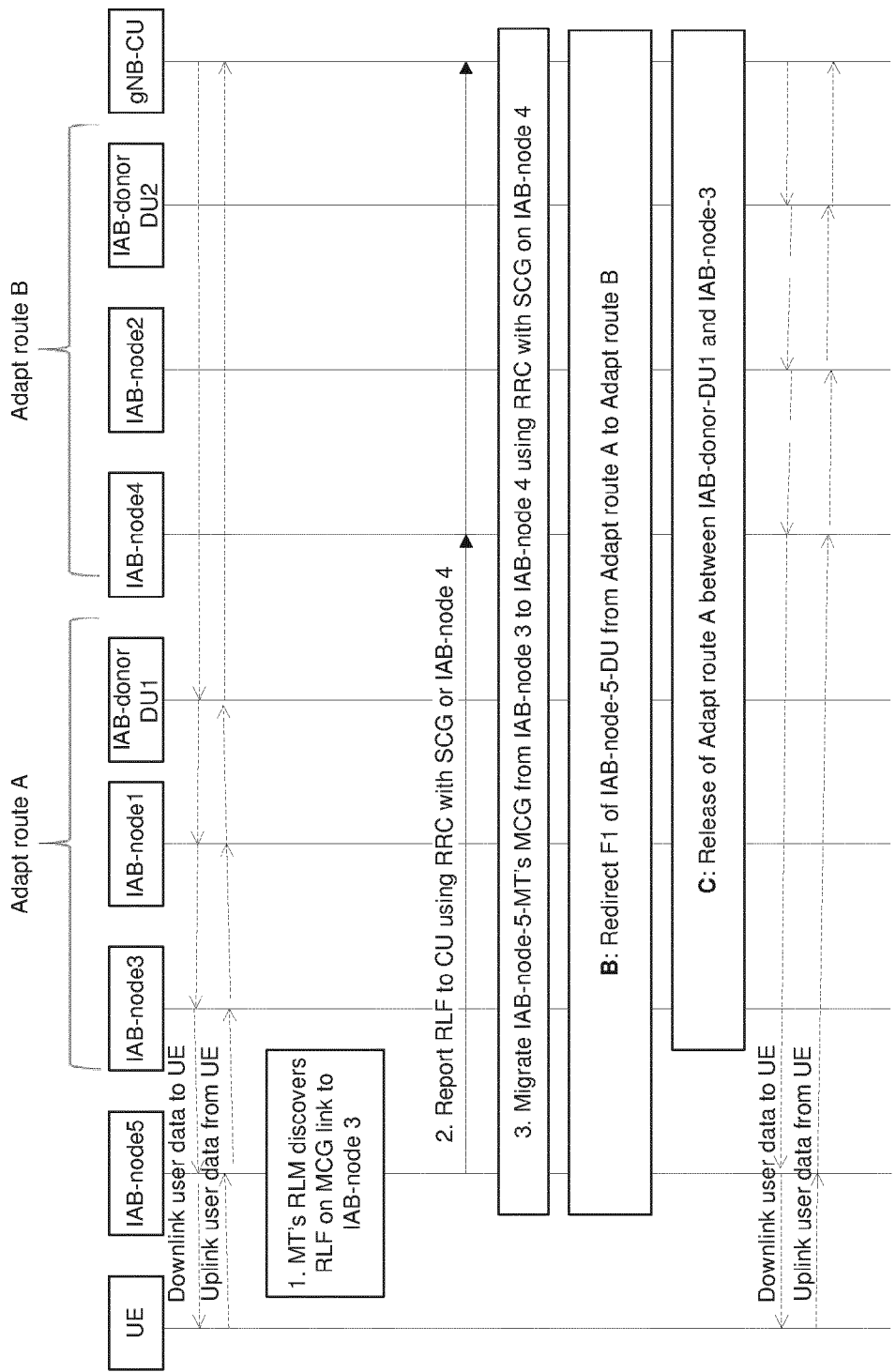
Figure 14:
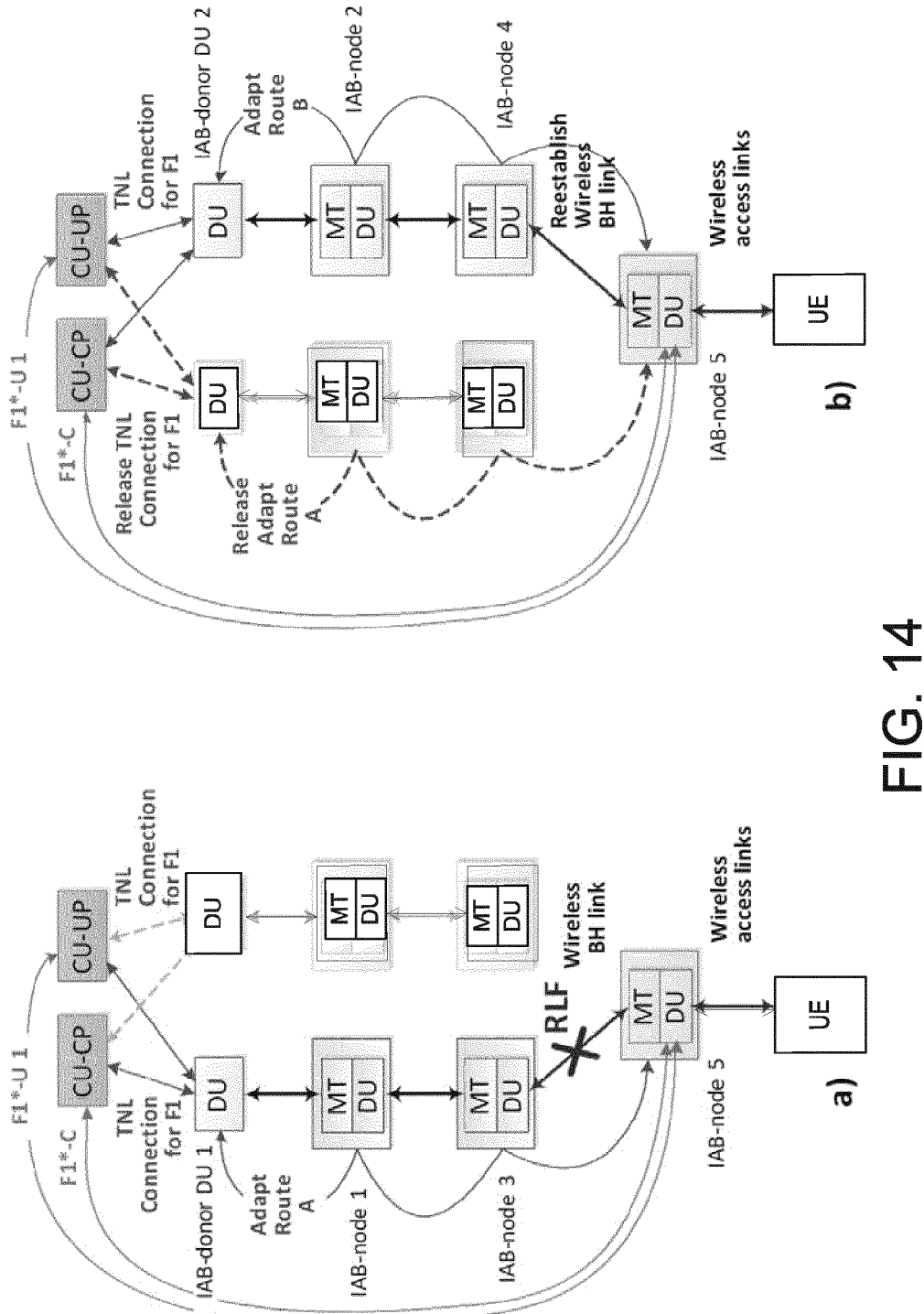
FIGS. 14 and 15 illustrate recovery via a newly established BH link using the same IAB donor central unit (CU)
Figure 15:
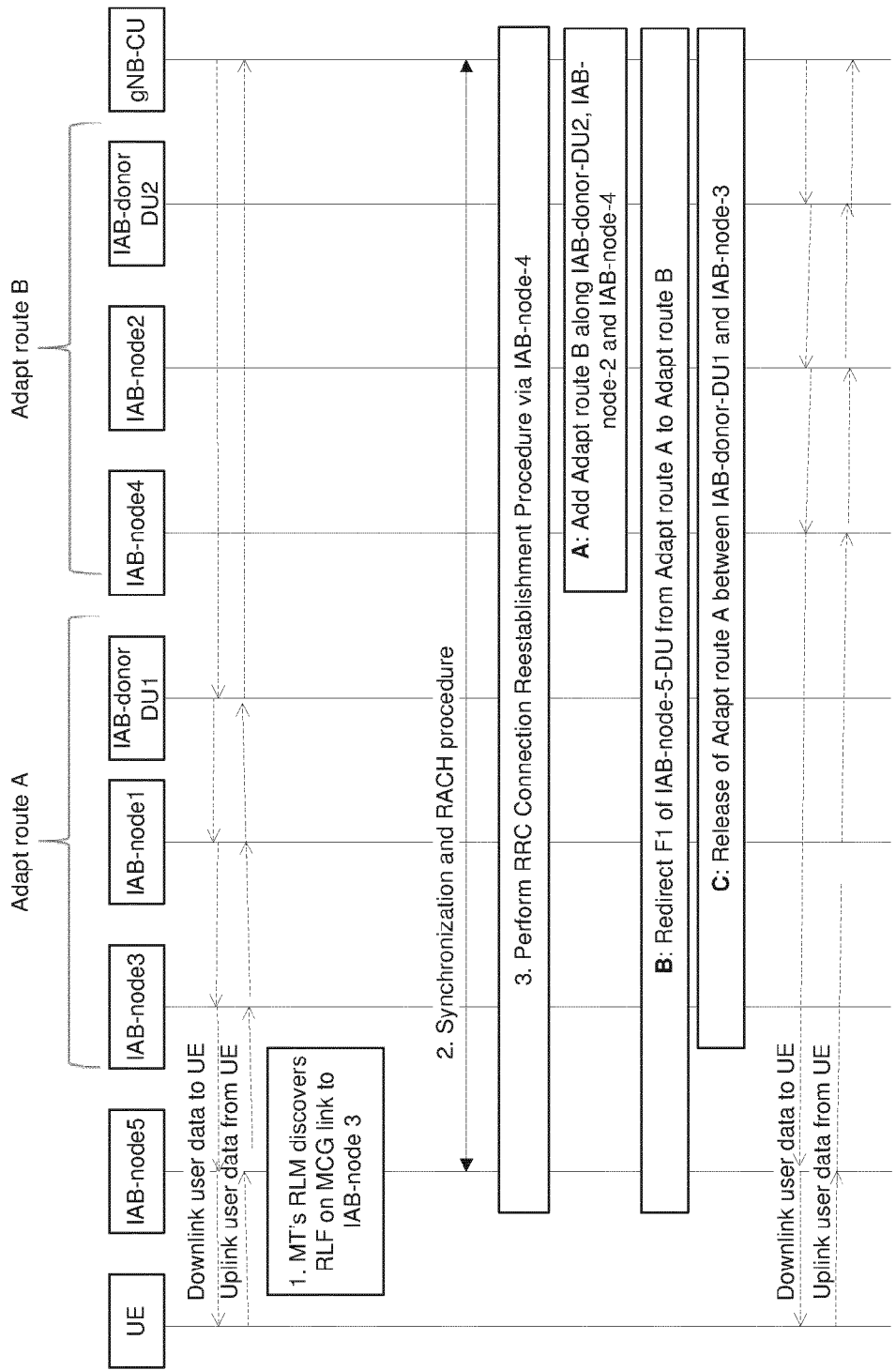
Figure 16:
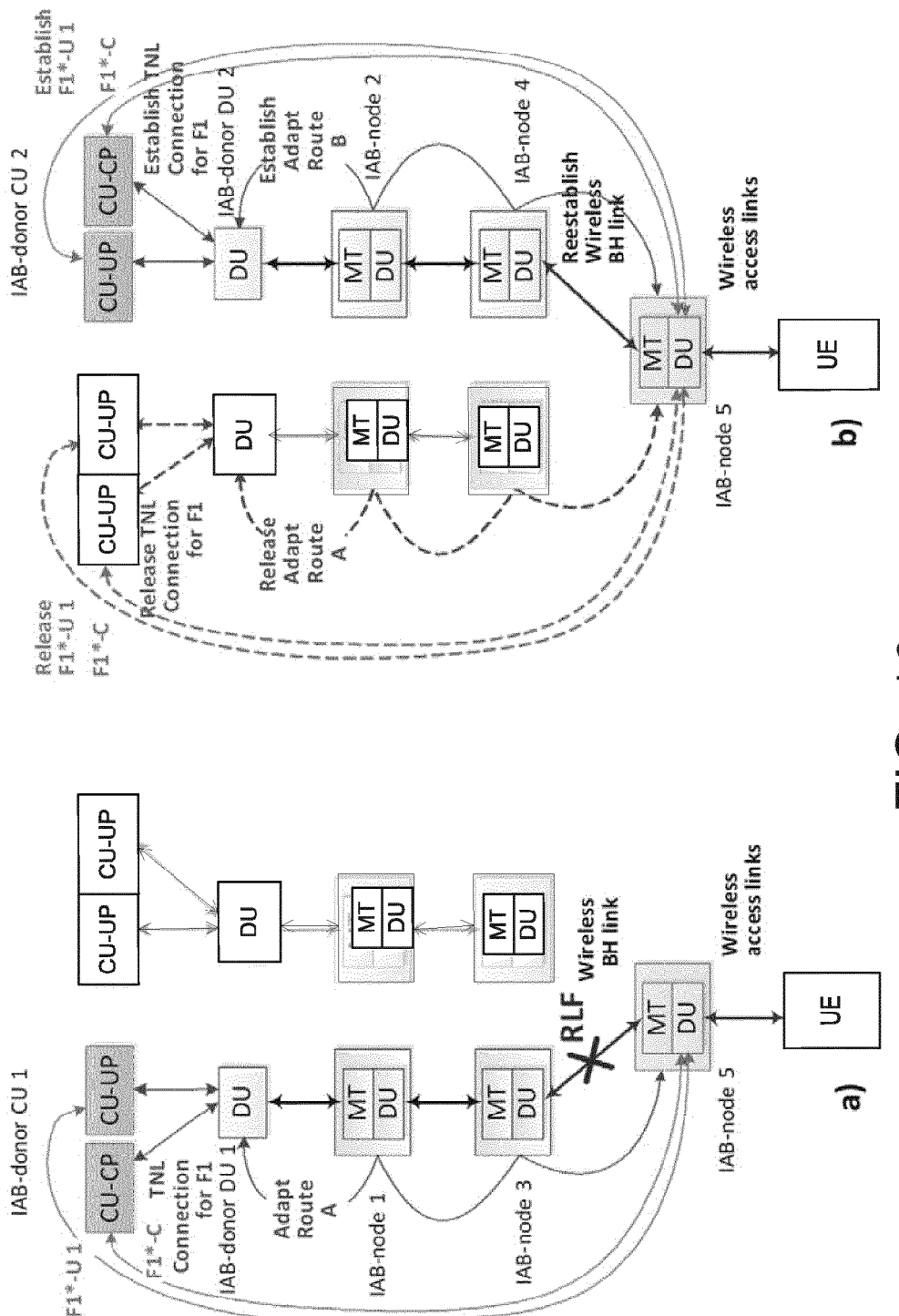
FIGS. 16 and 17 illustrate recovery via a newly established BH link using a different IAB donor CU.
Figure 17:
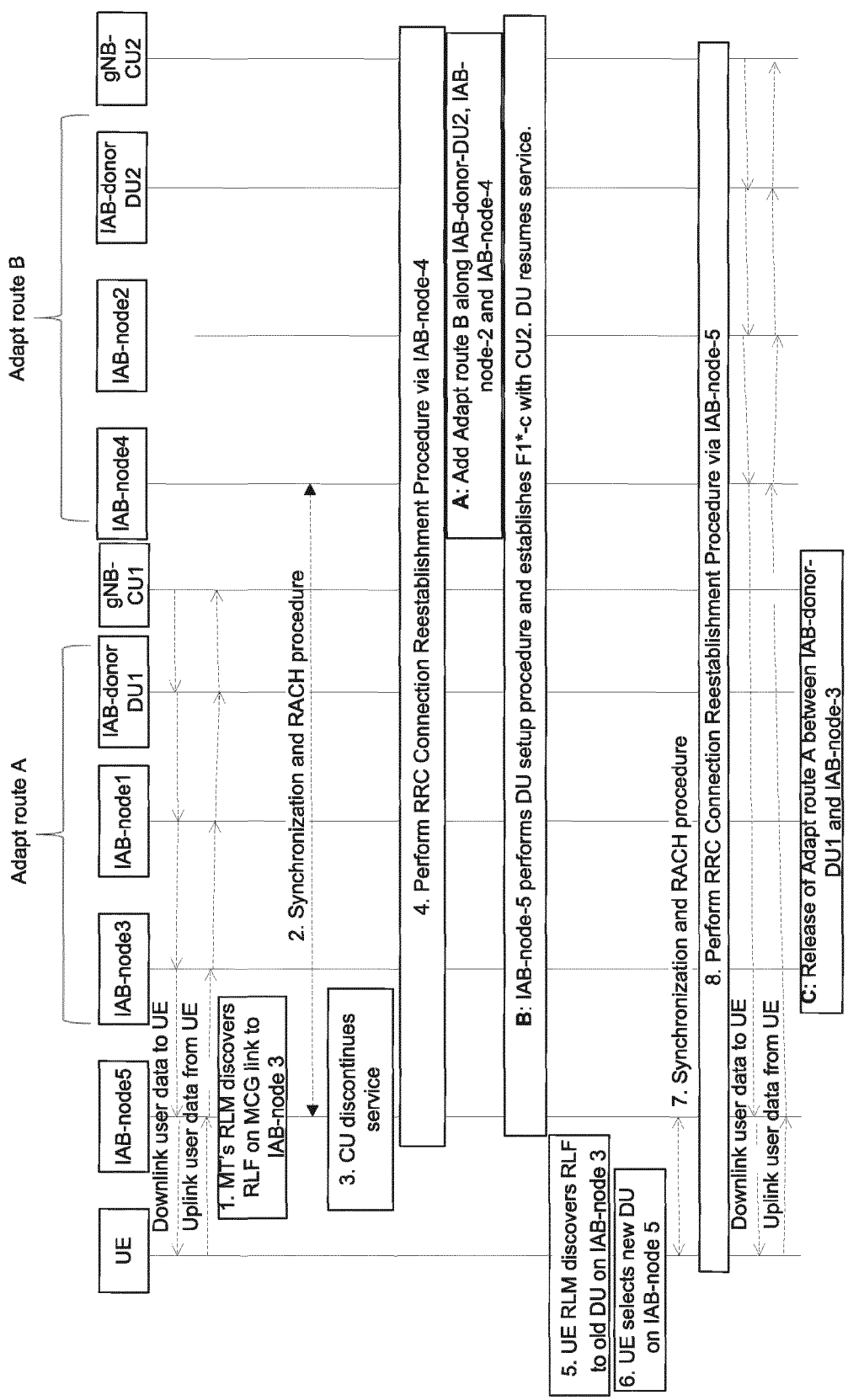
Figure 18:
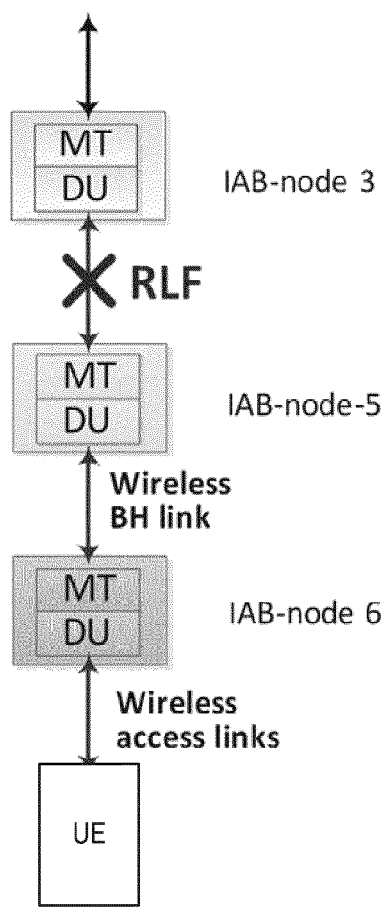
FIG. 18 illustrates an IAB node observing radio link failure (RLF) on its parent link.

When the IAB-node observes RLF on its parent link, in existing networks the IAB-node cannot provide further backhaul service to downstream IAB-nodes. Also, child IAB-nodes cannot further serve their descendant IAB-nodes. One example is shown in FIG. 18, where IAB-node-5 observes RLF in the link to its parent IAB-node-3 and subsequently cannot provide backhaul service to its child node, i.e., IAB-node-6.

While the IAB-node observing RLF may be aware about backhaul connectivity loss, the descendent IAB-nodes do not have explicit means to identify this upstream backhaul connectivity loss. In case the RLF can be recovered swiftly, as can be expected for BH-RLF-recovery scenario 1, there may be no need to explicitly inform the descendent IAB-nodes about the temporary BH connectivity loss. When the BH RLF cannot be recovered swiftly, it may be beneficial to release backhaul connectivity to descendant IAB-nodes so that they themselves can seek means to recover from the BH RLF. For this purpose, three options may be considered:

Option 1: The IAB-node DU discontinues service. Consequently, the child nodes will also determine BH RLF and follow through the above procedures to recover its link to the backhaul network.

Option 2: The IAB-node DU explicitly alerts child IAB-nodes about the upstream RLF. Child IAB-nodes receiving this alert can forward the alert further downstream. Each IAB-node receiving such alert initiates BH-RLF recovery as discussed above.

Option 3: Every IAB-node can regularly share information on, e.g., BH quality, to its child or parent IAB-nodes. In this manner, downstream or upstream RLF can be sensed without taking explicit actions.

In case a descendant IAB-node (such as IAB-node 6) can recover from such an upstream RLF by using one of the procedures described above, its DU can provide BH RLF-recovery for former ancestor nodes (such as IAB-node 5).

Efficient Backhaul Link Failure Recovery

The recovery procedure for backhaul failure scenarios 2 and 3 may include identifying an alternate parent node and establishing/re-establishing the control plane and user plane through the alternate parent node. However, identifying and attaching to an alternate node can take a significant amount of time and also may not always be possible, e.g., due to lost connectivity with the donor CU or due to lack of alternative parent nodes (especially in millimeter-wave deployments). It may be useful to consider how the IAB network is reorganized when there is a backhaul failure in a way that minimizes interruption time of connection with the IAB-donor.

Figure 19:
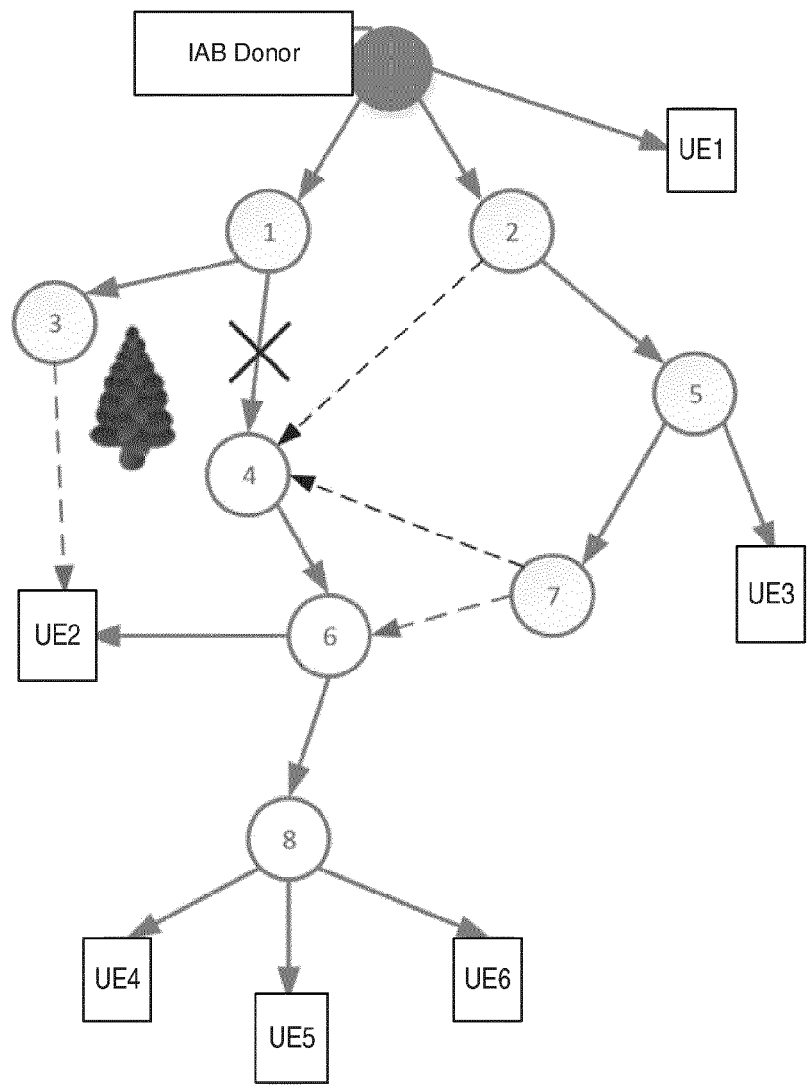
FIG. 19 illustrates a scenario of BH failure on a link in an IAB network.

FIG. 19 illustrates a scenario of a backhaul failure on one of the links in an IAB network. In such scenarios, many IAB-nodes and UEs may be left without a connection to the IAB-donor and may need to find alternate parent nodes. Downstream IAB-nodes (e.g., IAB-nodes 4, 6 in FIG. 19) and the IAB-donor may need to be informed of the backhaul failure. Furthermore, if all the affected IAB-nodes simultaneously try to find alternate parent nodes, the resulting topology may be inefficient.

One or more of the following may be considered for recovery from backhaul failures:

Information can be provided to downstream IAB-nodes regarding backhaul failure including a list of nodes that cannot serve as parent nodes due to the backhaul failure.

Preparation of alternative backhaul links and routes in advance (i.e., before occurrence of RLF).

Details for IAB topology setup and reconfiguration upon failure have not been established.

Examples of the IAB topology setup and reconfiguration upon failure are provided herein. In some embodiments, it may be assumed that the donor CU has an overall view of the current topology (e.g., which IAB node is connected to which, if there are more than one paths to reach a certain IAB node, the number of hops a packet has to traverse, etc.). However, the IAB nodes or the donor DU may not have topology information about the whole network but may only be aware of the child nodes that such IAB nodes are serving and their parent IAB nodes (or donor DU, if on the first hop). Not only that, such IAB nodes may have limited information about these children and parent nodes. For this reason, it may not be possible to utilize the information of the overall IAB topology in the IAB nodes and donor DU, which could lead to sub-optimal treatment of the traffic to the connected IAB nodes. Some examples of sub-optimal treatment of traffic include:

IAB nodes with multiple simultaneous paths may receive a large share of the shared resources since the nodes allocating radio resources to them (e.g., parent node or DU) is not aware of the fact that they (IAB nodes) receive data via other path(s) and will also get resources from the other parent node(s).

IAB nodes experience a radio link failure (RLF) to their parent node (IAB or donor DU) are forced to recover their link failure by themselves even if their children IAB nodes have an alternative path to another parent node. This is because the IAB nodes with RLF have no awareness of alternative paths available to their children IAB nodes.

Accordingly, some embodiments of the present disclosure provide for methods and apparatuses to enable IAB nodes to become more informed about the connectivity information of their children and/or their parent nodes.

In some embodiments, IAB nodes are informed if their children IAB nodes have alternate path(s) available to the donor node that do not traverse their immediate parents (i.e., if they have more than one parent or not). Similarly, the child nodes can be informed if their parent nodes have more than one path to the donor node.

In some embodiments, the IAB nodes can use this information for optimal operation, such as, for example, one or more of the following:

Scheduling prioritization among their children nodes;
Effective handling of backhaul recovery failure; and/or
Load balancing and avoiding link congestion.

Some of the techniques in the present disclosure may provide for knowing which of the children IAB nodes have alternate paths or not and may enable the parent node to make a more informed scheduling decision as compared to existing techniques (e.g., prioritize the children IAB nodes that have no alternative path).

Some of the techniques in the present disclosure may provide for knowing which of the children IAB nodes have alternate path or not and may enable an optimized backhaul link failure recovery as compared to existing techniques (e.g., parent node will inform the child nodes that have no alternate path to stop data transmission and/or find alternate paths, and inform those child nodes that have alternate paths to start routing all uplink (UL) data via the alternate path).

Some of the techniques in the present disclosure may provide for knowing whether a candidate parent node has alternate paths or not and may enable IAB nodes to prioritize/select a parent node that has the greatest number of paths, the least number of hops, etc.

Before describing in detail exemplary embodiments, it is noted that the embodiments reside primarily in combinations of apparatus components and processing steps related to using alternative paths of descendant nodes for backhaul-link failure reporting in integrated access. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, the term "topology" refers to the logical arrangement of the network referenced to how data and signaling are moved through the network. Thus, modification and/or reconfiguration of the topology discussed herein refer to a change in the logical relationship of the nodes in the network which might then impact/change the communication path among the nodes.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE), such as a wireless device (WD) or a radio network node. In some embodiments, the network node may comprise of an IAB node, a donor IAB node, a parent node, and/or a child node.

In some embodiments, the non-limiting terms wireless device (WD) or a user equipment (UE) are used interchangeably. The UE or WD herein can be any type of user equipment capable of communicating with a network node or another UE over radio signals, such as wireless device (WD) or UE. The UE or WD may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 20:
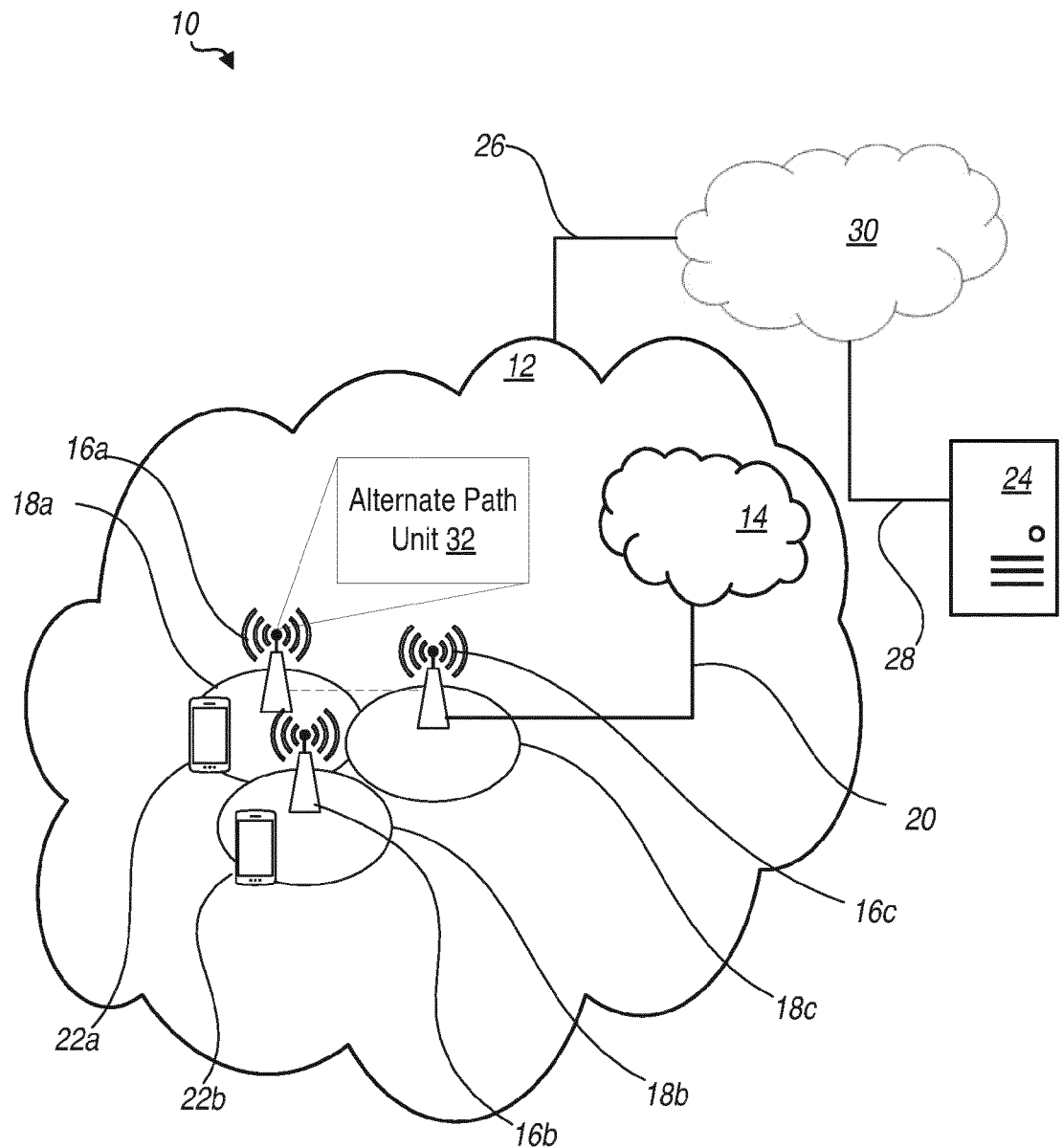
FIG. 20 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 20 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first user equipment (UE) 22a located in coverage area 18a is configured to wirelessly connect to, or be paged by, the corresponding network node 16a. A second UE 22b in coverage area 18b is wirelessly connectable to the corresponding network node 16b. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 20 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected UE 22a. Similarly, the network node 16 need not be aware of the future routing of an outgoing uplink communication originating from the UE 22a towards the host computer 24.

In some embodiments, a network node 16 is configured to include an alternate path unit 32 which is configured to receive information indicating at least one alternate path of at least one child IAB node to an IAB donor node, the at least one child IAB node being a wireless backhaul node; and use the received information to perform at least one of a backhaul wireless link failure recovery and load balancing of traffic.

In some embodiments, a network node 16 is configured to include an alternate path unit 32 which is configured to receive information indicating at least one alternate path of at least one child node to a donor node; and use the received information to perform at least one operational task.

In some embodiments, a network node 16 is configured to include an alternate path unit 32 which is configured to receive information indicating at least one alternate path of a parent IAB node to an IAB donor node, the parent IAB node being a wireless backhaul node for the child IAB node; and use the received information to perform at least one operational task.

In some embodiments, the network node 16 is configured to include an alternate path unit 32 which is configured to receive information indicating at least one alternate path of the network node to a donor node; and use the received information to perform at least one operational task.

Example implementations, in accordance with an embodiment, of the UE 22, network node 16 and host computer 24 discussed in the preceding paragraphs will now be described with reference to FIG. 21. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the user equipment 22. The processing circuitry 42 of the host computer 24 may include a monitor unit 54 configured to enable the service provider to observe, monitor, control, transmit to and/or receive from the network node 16 and/or the user equipment 22.

The communication system 10 further includes a network node 16 provided in a communication system 10 and including hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

Figures 22, 23:
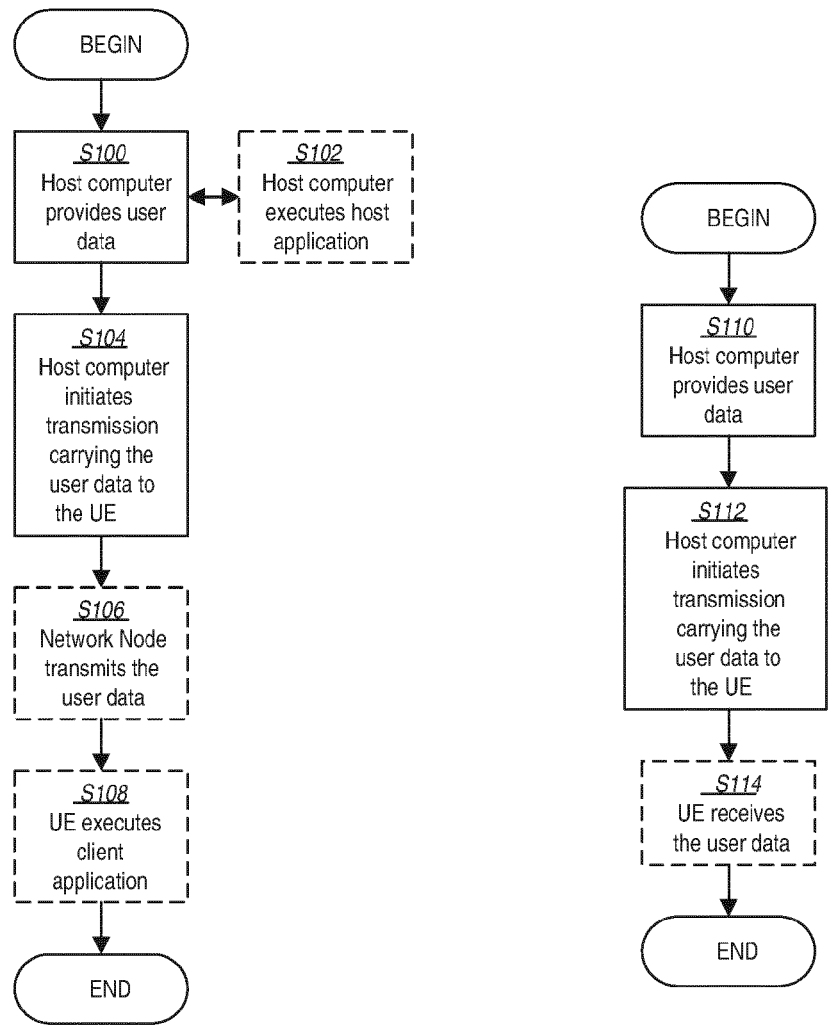
FIG. 22 is a flowchart illustrating exemplary methods implemented in a communication system including a host computer, a network node and a user equipment for executing a client application at a user equipment according to some embodiments of the present disclosure.
FIG. 23 is a flowchart illustrating exemplary methods implemented in a communication system including a host computer, a network node and a user equipment for receiving user data at a user equipment according to some embodiments of the present disclosure.

In some embodiments, network node 16a (e.g., parent or donor IAB node) and network node 16b (e.g., child IAB node) may be connected via a wireless backhaul link 67. Even though various components have been omitted from network node 16b in FIG. 22 for ease of understanding, the discussion of the components of network node 16, i.e., network node 16a in FIG. 22, is equally applicable to any of network nodes 16a-16n.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16.

Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16, such as the network node processes described with reference to FIGS. 26 and 27 as well as the other figures. The network node 16 may be configured as a parent node, a child node and/or both (e.g., a parent node relative to one node, while being a child node of another node). For example, processing circuitry 68 of the network node 16, which may be a parent node having at least one child node, may include alternate path unit 32 configured to receive information indicating at least one alternate path of at least one child node to a donor node; and use the received information to perform at least one operational task.

In some embodiments, the at least one operational task includes one or more of: prioritizing traffic from each of the at least one child node; performing backhaul failure recovery; and performing load balancing of traffic for each of the at least one child node. In some embodiments, the information indicates only the alternative paths to the donor node that do not traverse the network node 16. In some embodiments, the information indicates one or more of: a number of alternate parent nodes (e.g., for each of the at least one child node); for each of the at least one alternate path, a number of hops to reach the donor node via the alternate path; for each of the at least one alternate path, whether the alternate path is an active path or a fallback path; traffic congestion of each of the at least one alternate path; and for each of the at least one alternate path, whether the alternate path is link disjoint to a path from the network node to the donor node. In some embodiments, one or more of: the information is received from at least one of the donor node and the at least one child node; the information is received via radio resource control signaling; and the information is received as a result of a request for the information from the network node.

In another aspect, processing circuitry 68 of the network node 16, which may be a child node having at least one parent node, may include alternate path unit 32 configured to receive information indicating at least one alternate path of the network node 16 to a donor node (e.g., alternate paths to the donor node via different parent nodes); and use the received information to perform at least one operational task.

In some embodiments of this aspect, the information indicates one or more of: a number of intermediate parent nodes of the network node 16; alternate paths available through each intermediate parent node; and a number of hops to reach the donor node via each of the alternate paths. In some embodiments, one or more of: the information is received from at least one of the donor node and a parent node of the network node 16; and the information is received from the parent node via broadcast signaling. In some embodiments, the at least one operational task includes one or more of: prioritizing connection establishment of a parent node having a greatest number of paths to the donor node, as compared to other parent nodes; prioritizing connection establishment of a parent node having a least number of hops to the donor node, as compared to other parent nodes; performing load balancing of traffic toward the parent nodes based on at least one of a number of paths and a number of hops to the donor node; and controlling admission of child nodes based on a number of parent nodes.

The communication system 10 further includes the UE 22 already referred to. The UE 22 may have hardware 80 that may include a radio interface 82 configured to set up and maintain a wireless connection 64 with a network node 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22. For example, the processing circuitry 84 of the user equipment 22 may include a unit configured to send uplink (UL) data to the network node 16 and/or to receive downlink (DL) data from the network node 16, which data may be communicated, managed, packaged, forwarded, transmitted, etc. via multiple network nodes 16, which may be organized into a child-parent node structure for handling traffic for the UE 22 according to at least some of the techniques in the present disclosure.

Figure 21:
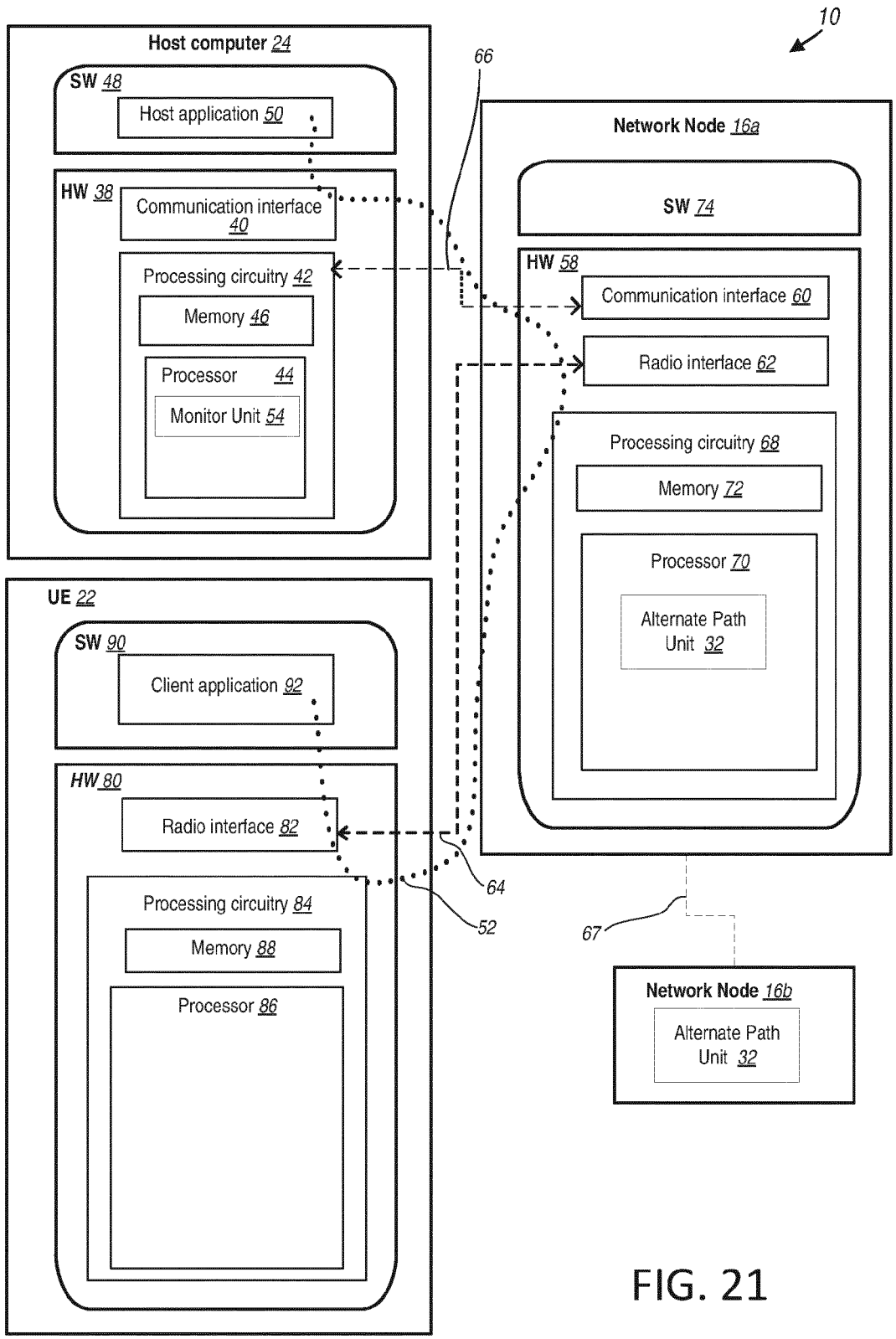
FIG. 21 is a block diagram of a host computer communicating via a network node with a user equipment over an at least partially wireless connection according to some embodiments of the present disclosure.

In some embodiments, the inner workings of the network node 16, UE 22, and host computer 24 may be as shown in FIG. 21 and independently, the surrounding network topology may be that of FIG. 20.

In FIG. 21, the OTT connection 52 has been drawn abstractly to illustrate the communication between the host computer 24 and the user equipment 22 via the network node 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 22 and the network node 16 is in accordance with the teachings of the embodiments described throughout this disclosure. One or more of the various embodiments improve the performance of OTT services provided to the UE 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a network node 16. In some embodiments, the UE 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 20 and 21 show various "units" such as alternate path unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 22 is a flowchart illustrating an exemplary method implemented in a communication system, such as, for example, the communication system of FIGS. 20 and 21, in accordance with one embodiment. The communication system may include a host computer 24, a network node 16 and a UE 22, which may be those described with reference to FIG. 21. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the UE 22 (Block S104). In an optional third step, the network node 16 transmits to the UE 22 the user data which was carried in the transmission that the host computer 24 initiated, in accordance with the teachings of the embodiments described throughout this disclosure (Block S106). In an optional fourth step, the UE 22 executes a client application, such as, for example, the client application 92, associated with the host application 50 executed by the host computer 24 (Block S108).

FIG. 23 is a flowchart illustrating an exemplary method implemented in a communication system, such as, for example, the communication system of FIG. 20, in accordance with one embodiment. The communication system may include a host computer 24, a network node 16 and a UE 22, which may be those described with reference to FIGS. 20 and 21. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the UE 22 (Block S112). The transmission may pass via the network node 16, in accordance with the teachings of the embodiments described throughout this disclosure. In an optional third step, the UE 22 receives the user data carried in the transmission (Block S114).

Figures 24, 25:
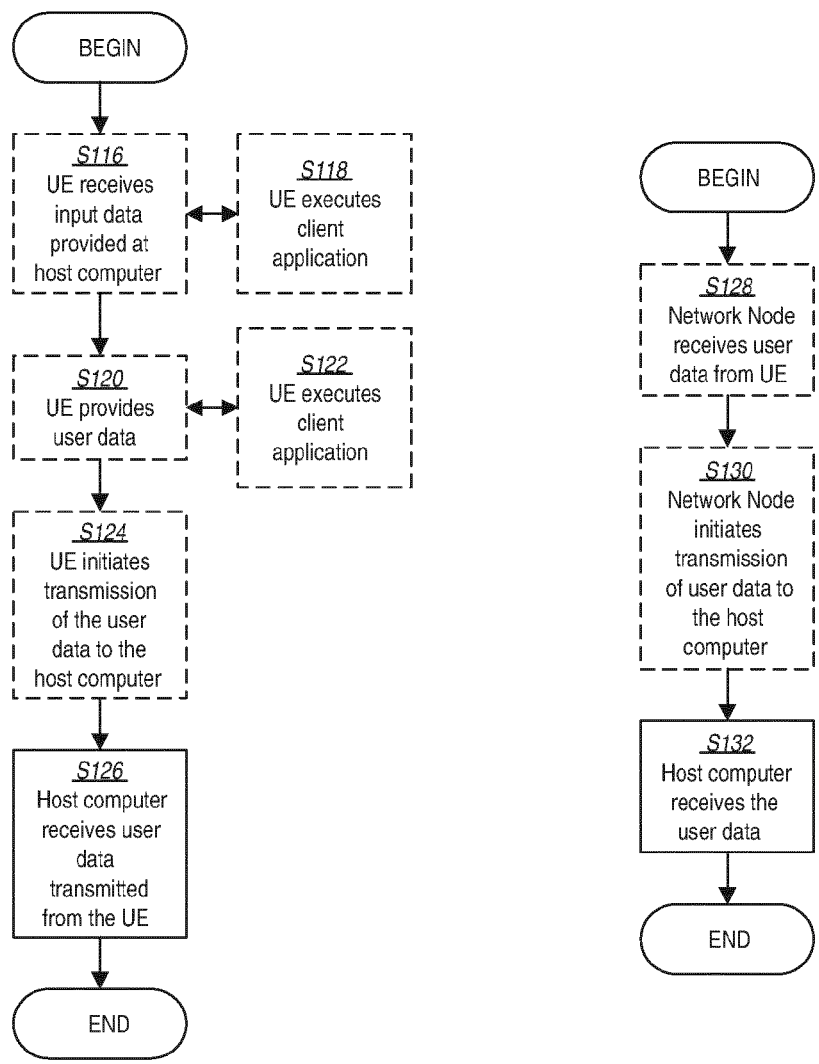
FIG. 24 is a flowchart illustrating exemplary methods implemented in a communication system including a host computer, a network node and a user equipment for receiving user data from the user equipment at a host computer according to some embodiments of the present disclosure.
FIG. 25 is a flowchart illustrating exemplary methods implemented in a communication system including a host computer, a network node and a user equipment for receiving user data at a host computer according to some embodiments of the present disclosure.

FIG. 24 is a flowchart illustrating an exemplary method implemented in a communication system, such as, for example, the communication system of FIG. 20, in accordance with one embodiment. The communication system may include a host computer 24, a network node 16 and a UE 22, which may be those described with reference to FIGS. 20 and 21. In an optional first step of the method, the UE 22 receives input data provided by the host computer 24 (Block S116). In an optional substep of the first step, the UE 22 executes the client application 92, which provides the user data in reaction to the received input data provided by the host computer 24 (Block S118). Additionally or alternatively, in an optional second step, the UE 22 provides user data (Block S120). In an optional substep of the second step, the UE provides the user data by executing a client application, such as, for example, client application 92 (Block S122). In providing the user data, the executed client application 92 may further consider user input received from the user. Regardless of the specific manner in which the user data was provided, the UE 22 may initiate, in an optional third substep, transmission of the user data to the host computer 24 (Block S124). In a fourth step of the method, the host computer 24 receives the user data transmitted from the UE 22, in accordance with the teachings of the embodiments described throughout this disclosure (Block S126).

FIG. 25 is a flowchart illustrating an exemplary method implemented in a communication system, such as, for example, the communication system of FIG. 20, in accordance with one embodiment. The communication system may include a host computer 24, a network node 16 and a UE 22, which may be those described with reference to FIGS. 20 and 21. In an optional first step, in accordance with the teachings of the embodiments described throughout this disclosure, the network node 16 receives user data from the UE 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 26:
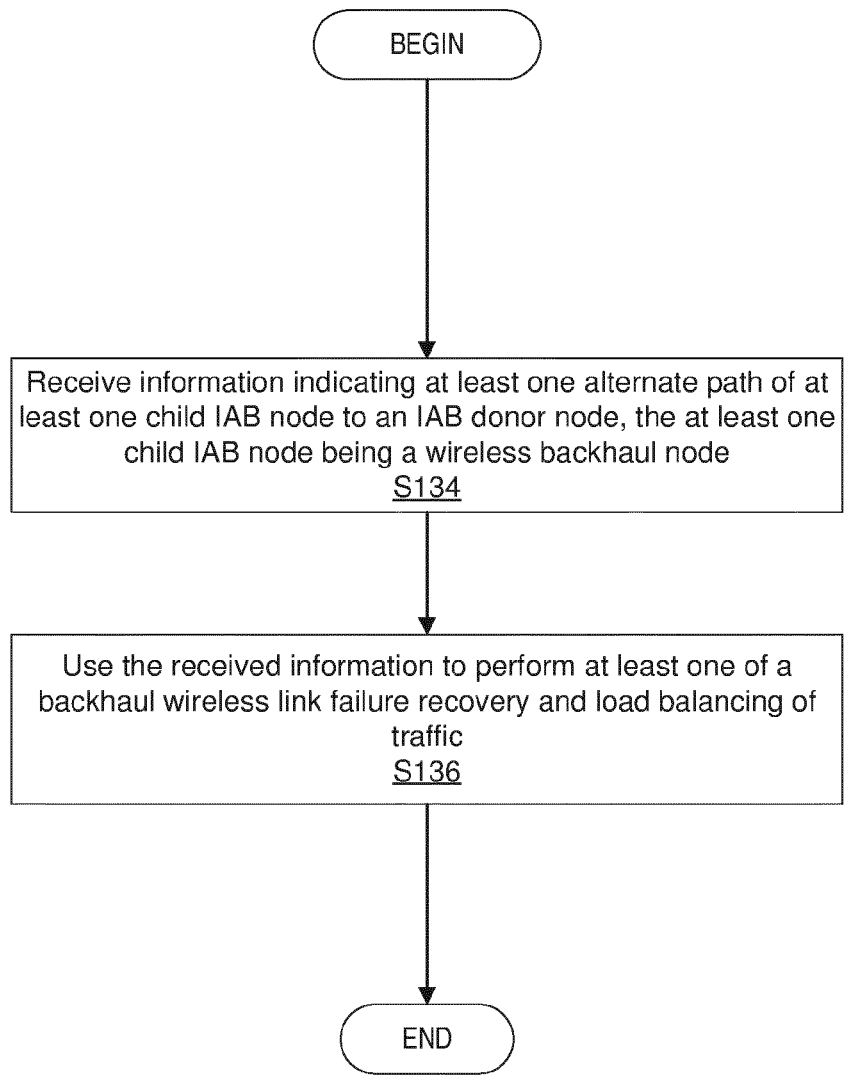
FIG. 26 is a flowchart of an exemplary process in a network node for alternate path unit according to some embodiments of the present disclosure.

FIG. 26 is a flowchart of an exemplary process in a network node 16 for using alternate paths for backhaul link failure reporting according to the present disclosure. One or more Blocks and/or functions and/or methods performed by the network node 16 may be performed by one or more elements of network node 16 such as by alternate path unit 32 in processing circuitry 68, processor 70, communication interface 60, radio interface 62, etc. according to the example method. The example method may include receiving (Block S134), such as by alternate path unit 32, processing circuitry 68, processor 70, radio interface 62 and/or communication interface 60, information indicating at least one alternate path of at least one child IAB node to an IAB donor node, the at least one child IAB node being a wireless backhaul node. The method includes using (Block S136), such as by alternate path unit 32, processing circuitry 68, processor 70, radio interface 62 and/or communication interface 60, the received information to perform at least one of a backhaul wireless link failure recovery and load balancing of traffic.

In some embodiments, using the received information to perform the at least one of the backhaul wireless link failure recovery and the load balancing of traffic further includes using, such as by alternate path unit 32, processing circuitry 68, processor 70, radio interface 62 and/or communication interface 60, the received information to perform the backhaul wireless link failure recovery by informing a child IAB node that has an alternate path to start routing all uplink data via the alternate path. In some embodiments, using the receiving information to perform the at least one of the backhaul wireless link failure recovery and the load balancing of traffic further includes using, such as by alternate path unit 32, processing circuitry 68, processor 70, radio interface 62 and/or communication interface 60, the received information to perform the load balancing of traffic by at least one of prioritizing traffic from each of the at least one child IAB node and load balancing of traffic for each of the at least one child IAB node.

In some embodiments, the information indicates only alternative paths of the at least one child IAB node to the IAB donor node that do not traverse the IAB node. In some embodiments, the received information indicates at least one of: a number of alternate parent IAB nodes; for each of the at least one alternate path, a number of hops to reach the IAB donor node via the at least one alternate path; for each of the at least one alternate path, whether the alternative path is one of an active path or a fallback path; traffic congestion along each of the at least one alternate path; and for each of the at least one alternate path, whether the alternate path is link disjoint to a path from the IAB node to the IAB donor node.

In some embodiments, receiving the information indicating the at least one alternate path of the at least one child IAB node to the IAB donor node further includes at least one of: receiving, such as by alternate path unit 32, processing circuitry 68, processor 70, radio interface 62 and/or communication interface 60, the information from at least one of the IAB donor node and the at least one child IAB node; receiving, such as by alternate path unit 32, processing circuitry 68, processor 70, radio interface 62 and/or communication interface 60, the information via radio resource control signaling; receiving, such as by alternate path unit 32, processing circuitry 68, processor 70, radio interface 62 and/or communication interface 60, the information via F1 signaling; and receiving, such as by alternate path unit 32, processing circuitry 68, processor 70, radio interface 62 and/or communication interface 60, the information as a result of a request for the information from the IAB node.

In some embodiments, the method includes receiving, such as via alternate path unit 32 and/or processing circuitry 68, information indicating at least one alternate path of at least one child node to a donor node. The process includes using, such as via alternate path unit 32 and/or processing circuitry 68, the received information to perform at least one operational task.

In some embodiments, the at least one operational task includes one or more of: prioritizing traffic from each of the at least one child node; performing backhaul failure recovery; and performing load balancing of traffic for each of the at least one child node. In some embodiments, the information indicates only the alternative paths to the donor node that do not traverse the network node 16. In some embodiments, the information indicates one or more of: a number of alternate parent nodes; for each of the at least one alternate path, a number of hops to reach the donor node via the alternate path; for each of the at least one alternate path, whether the alternate path is an active path or a fallback path; traffic congestion of each of the at least one alternate path; and for each of the at least one alternate path, whether the alternate path is link disjoint to a path from the network node 16 to the donor node. In some embodiments, one or more of: the information is received from at least one of the donor node and the at least one child node; the information is received via radio resource control signaling; and the information is received as a result of a request for the information from the network node 16.

Figure 27:
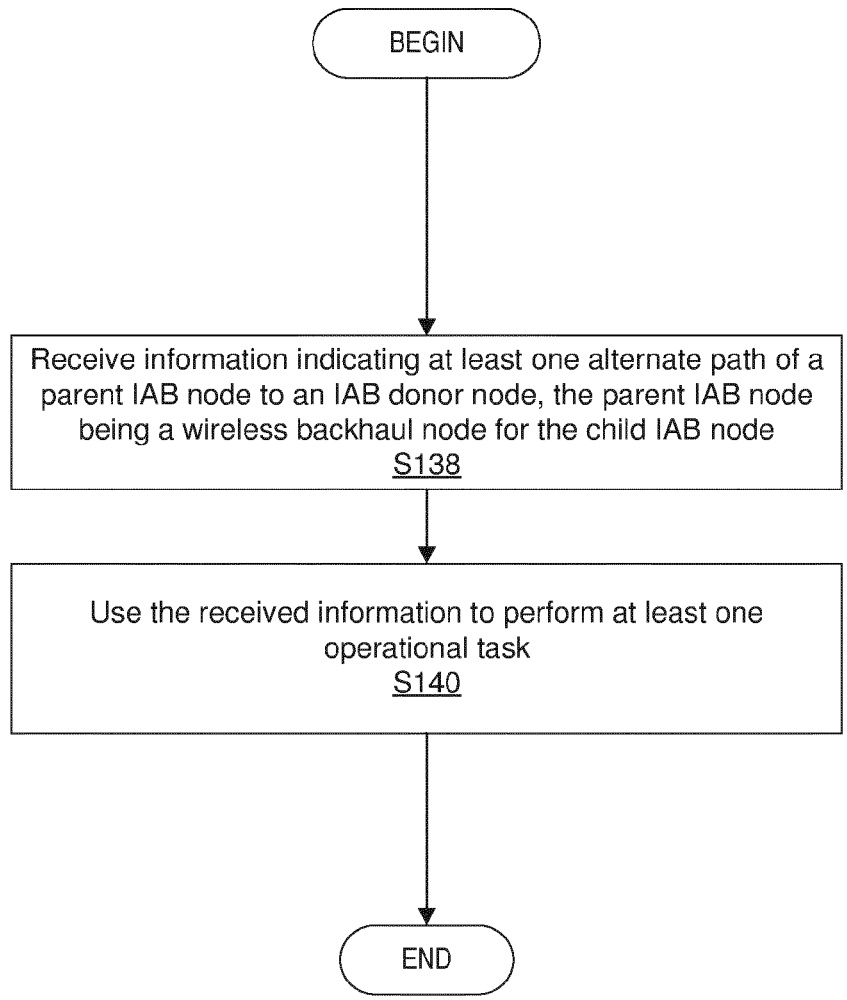
FIG. 27 is a flowchart of an exemplary process in a network node for alternate path unit according to some embodiments of the present disclosure.

FIG. 27 is a flowchart of another exemplary process in a network node 16 according to some embodiments of the present disclosure. One or more Blocks and/or functions and/or methods performed by the network node 16 may be performed by one or more elements of network node 16 such as by alternate path unit 32 in processing circuitry 68, processor 70, radio interface 62, communication interface 60, etc. according to the example method. The example method includes receiving (Block S138), such as by alternate path unit 32, processing circuitry 68, processor 70, radio interface 62 and/or communication interface 60, information indicating at least one alternate path of a parent IAB node to an IAB donor node, the parent IAB node being a wireless backhaul node for the child IAB node. The method includes using (Block S140), such as by alternate path unit 32, processing circuitry 68, processor 70, radio interface 62 and/or communication interface 60, the received information to perform at least one operational task.

In some embodiments, the at least one operational task further includes prioritizing, such as by alternate path unit 32, processing circuitry 68, processor 70, radio interface 62 and/or communication interface 60, connection establishment of the parent IAB node having a greatest number of paths to the IAB donor node, as compared to other parent IAB nodes of the child IAB node. In some embodiments, the at least one operational task further includes prioritizing, such as by alternate path unit 32, processing circuitry 68, processor 70, radio interface 62 and/or communication interface 60, connection establishment of the parent IAB node having a least number of hops to the IAB donor node, as compared to other parent IAB nodes of the child IAB node. In some embodiments, the at least one operational task further includes performing, such as by alternate path unit 32, processing circuitry 68, processor 70, radio interface 62 and/or communication interface 60, load balancing of traffic toward parent IAB nodes based on at least one of a number of alternate paths of a parent IAB node to the IAB donor node and a number of hops from the parent IAB node to the IAB donor node.

In some embodiments, the information indicates at least one of: a number of intermediate parent IAB nodes of the parent IAB node; alternate paths available through each intermediate parent IAB node; and a number of hops from the parent IAB node to reach the donor IAB node via each of the at least one alternate path. In some embodiments, receiving the information indicating the at least one alternate path of the parent IAB node to the IAB donor node further includes receiving, such as by alternate path unit 32, processing circuitry 68, processor 70, radio interface 62 and/or communication interface 60, the information from at least one of the IAB donor node and the parent IAB node. In some embodiments, receiving the information indicating the at least one alternate path of the parent IAB node to the IAB donor node further includes receiving, such as by alternate path unit 32, processing circuitry 68, processor 70, radio interface 62 and/or communication interface 60, the information via radio resource control signaling. In some embodiments, receiving the information indicating the at least one alternate path of the parent IAB node to the IAB donor node further includes receiving, such as by alternate path unit 32, processing circuitry 68, processor 70, radio interface 62 and/or communication interface 60, the information via F1 signaling. In some embodiments, receiving the information indicating the at least one alternate path of the parent IAB node to the IAB donor node further includes receiving, such as by alternate path unit 32, processing circuitry 68, processor 70, radio interface 62 and/or communication interface 60, the information from the parent IAB node via broadcast signaling.

In some embodiments, the method includes receiving, such as via alternate path unit 32 and/or processing circuitry 68, information indicating at least one alternate path of the network node 16 to a donor node. The method includes using, such as via alternate path unit 32 and/or processing circuitry 68, the received information to perform at least one operational task.

In some embodiments, the information indicates one or more of: a number of intermediate parent nodes of the network node; alternate paths available through each intermediate parent node; and a number of hops to reach the donor node via each of the alternate paths. In some embodiments, one or more of: the information is received from at least one of the donor node and a parent node of the network node 16; and the information is received from the parent node via broadcast signaling. In some embodiments, the at least one operational task includes one or more of: prioritizing connection establishment of a parent node having a greatest number of paths to the donor node, as compared to other parent nodes; prioritizing connection establishment of a parent node having a least number of hops to the donor node, as compared to other parent nodes; performing load balancing of traffic toward the parent nodes based on at least one of a number of paths and a number of hops to the donor node; and controlling admission of child nodes based on a number of parent nodes.

Having described some embodiments related to using alternative paths of descendant nodes for backhaul-link failure reporting in integrated access, a more detailed description of some of the embodiment is described below.

It should be understood that each of the nodes discussed herein (e.g., an IAB node, a donor IAB node, a parent node, and/or a child node) may be implemented as a network node, which is used in a broad sense, such as the network node 16, discussed herein above. Furthermore, as used herein, the terms "children", "child node", "descendant node", "IAB child node", "IAB node" and the like may be used interchangeably. Also, the terms "parent", "parent node", "IAB node", "IAB parent node" and the like may be used interchangeably.

Figure 28:
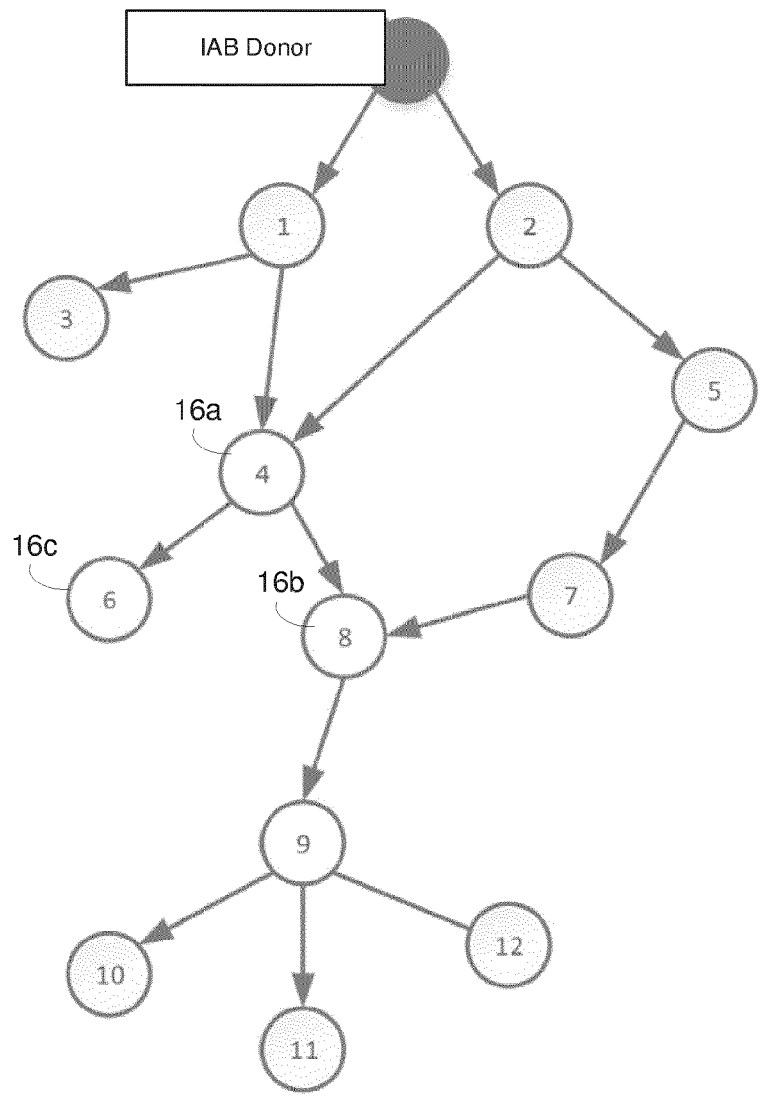
FIG. 28 illustrates an example IAB network topology to illustrate at some of the embodiments according to the present disclosure.

In some embodiments of the present disclosure, an IAB node (e.g., network node 16) is informed if its children IAB nodes (e.g., network node 16) have alternate path(s) available to the donor node (e.g., network node 16) that does not traverse their immediate parents (i.e., if the children IAB nodes have more than one parent or not). For the example deployment scenario shown in FIG. 28, IAB node 4 (e.g. network node 16*a*) can be informed that IAB node 6 (child IAB node of IAB node 4) (e.g., network node 16*c*) has no alternate paths while IAB node 8 (another child IAB node of IAB node 4) (e.g., network node 16*b*) has an alternate path (e.g., donor-node 2-node 5-node 7). It should be noted that looking from an end-to-end point of view (i.e., from a given IAB node to the donor DU), node 6 has actually two paths (donor-node1-node-4-node6 and donor-node2-node4-node6), but since both paths traverse node 4, from node 4's perspective, node 6 only has one path, according to some embodiments of the present disclosure. Thus, it can be seen that, in some embodiments, the relevant information on the use of alternative paths for descendant nodes may be specifically, how many other immediate parents a child IAB node has.

In some embodiments, the information exchanged can be, for example, binary information signifying that a child node has an alternate path (a "0" meaning no alternative parent, "1" meaning alternate parent available). In some embodiments, the information exchanged can include detailed information such as one or more of the following:
- the number of alternate parents;
- the number of hops to reach an IAB donor via each alternate parent (e.g., node 4 will get the information that child IAB node 8 has an alternate parent that provides a path to the donor via 4 hops);
- whether the alternate path(s) are active or just fallback paths that can be activated if the current parent fails (or the backhaul of the current parent fails);
- an indication of the traffic congestion on the alternate path(s) (e.g., this could be statistical information such as the average latency, data rates, etc. experienced via this alternate path); and/or
- whether the alternate path(s) are link disjoint to the path from the parent IAB node to the donor DU.

In some embodiments, the information can be exchanged from the donor CU (e.g., network node 16) to the IAB node 16 (e.g., via F1 or radio resource control (RRC) signaling). For example, every time a child IAB node 16 connects to a parent IAB node 16, the path information can be provided from the CU (e.g., network node 16) to the parent IAB node 16. Similarly, in some embodiments, when a child IAB node 16 connects to another IAB node 16, the donor CU could inform the already connected parent node(s) about the addition of new paths. This can be performed every time a parent IAB node 16 is added and/or removed e.g., from the child IAB nodes 16 path(s) to the donor IAB node 16.

In other embodiments, the child IAB node 16 may directly inform its parent IAB node(s) 16 when the child IAB node 16 gets connected to a new parent IAB node 16 (e.g., as part of the RRC connection establishment procedure), or immediately after getting connected (e.g., via RRC signaling, similar to a measurement reporting, or UE 22 information response-like messages).

In some embodiments, the parent IAB node 16 may explicitly ask for such information from its children IAB nodes 16 (e.g., UE information request and response-like message exchange), or may explicitly ask for the information from the donor node.

In some embodiments, the IAB nodes 16 can use this information for optimal operation. One example is scheduling prioritization. For example, if an IAB node 16 is a parent to two children IAB nodes 16 and the IAB node 16 knows that child1 has no alternate path while child2 does, in scenarios where there are resource limitations, the IAB node 16 can give priority to the traffic from child1 over traffic from child2. This can be applied in both uplink (UL) and downlink (DL). As another example, if both children have alternate paths, but child1's alternate path is 4 hops away from the donor while child2's alternate path is 6 hops away, then child2's traffic could be prioritized. Other techniques for using the information for scheduling prioritization may also be implemented.

In some embodiments, the knowledge of alternate path availability of child IAB nodes 16 could also be used in performing effective back haul failure recovery. For example, mechanisms can be employed whereby an IAB node 16, upon detecting backhaul link failure, attempts to use a child IAB node 16 as a new parent. Knowing the alternate path status of child nodes 16, according to the present disclosure, can make it possible to perform such technique more effectively/selectively, rather than attempting to perform the technique with all the children IAB nodes 16 blindly.

In some embodiments, the information can also be used by the parent IAB node 16 to load balance and/or avoid link congestion. For example, the information can also be used by the parent IAB node 16 to inform the children IAB nodes 16 that have no alternate path to stop data transmission and/or find alternate paths (and/or activate an alternate path, if that path was setup for fallback but was not being used). In some embodiments, the information can also be used by the parent IAB node 16 to inform those child IAB nodes that have alternate paths to start routing all UL data via the alternate path, etc.

When it comes to child IAB nodes 16 becoming aware of the paths available to their different parent IAB nodes 16, the information exchange could be similar to the one discussed above regarding on how the parent IAB node 16 becomes aware of the children IAB nodes' 16 paths. That is, this information can be provided to the children IAB nodes 16 from the CU when the children IAB nodes 16 get connected to a new parent IAB node 16, or the information can be directly available to the children IAB nodes 16 from the parent IAB node 16. In this case, there is an additional possibility where the parent IAB node 16 can inform its children IAB nodes 16 about the parent IAB node's 16 path availability through broadcast signaling. For example, IAB nodes 16 can broadcast information (e.g., in a system information blocks) such as how many immediate parent IAB nodes 16 they have, the different paths available through each parent, how many hops each path has, etc. This information can be used by children IAB nodes 16 and potential children IAB nodes 16 in one or more of the following ways:

an IAB node 16 that is establishing a connection can prioritize a parent node 16 that has the greatest number of paths, the least number of hops, etc.;

an IAB node 16 that is already connected to more than one parent IAB node 16 can push more data to the parent IAB node 16 that has more paths, less number of hops, etc., as compared to the IAB node's 16 other parent IAB nodes 16 (e.g., an IAB node has two parent nodes 16, parent1 with just one path and parent2 with two paths. If the IAB node 16 has X bytes of data in its buffer, the IAB node 16 can send a buffer status report indicating ⅔ of that amount to parent2 and ⅓ of that amount to parent1); and/or an IAB node 16 that is already connected to more than one parent IAB node 16 (or has more than one alternate path to the donor node) can admit more children IAB nodes 16 during the admission control for new IAB nodes 16 connection compared to an IAB node 16 connected to only one parent IAB node 16 (or has only one path to the donor IAB node).

Techniques for enabling the exchange of information about the availability of alternative paths/parents for the children IAB nodes 16 of an IAB node 16, e.g., for enhanced scheduling and/or backhaul link failure recovery are described.

In addition, some embodiments may include one or more of the following (it is noted that the "nodes" referred to below may be IAB nodes):

Embodiment A1. A network node configured to facilitate communication with a user equipment (UE), the network node configured to, and/or comprising a radio interface and/or comprising processing circuitry configured to:

receive information indicating at least one alternate path of at least one child node to a donor node; and use the received information to perform at least one operational task.

Embodiment A2. The network node of Embodiment A1, wherein the at least one operational task includes one or more of:

prioritizing traffic from each of the at least one child node;

performing backhaul failure recovery; and performing load balancing of traffic for each of the at least one child node.

Embodiment A3. The network node of any one of Embodiments A1 and A2, wherein the information indicates only the alternative paths to the donor node that do not traverse the network node.

Embodiment A4. The network node of any one of Embodiments A1-A3, wherein the information indicates one or more of:

a number of alternate parent nodes;

for each of the at least one alternate path, a number of hops to reach the donor node via the alternate path;

for each of the at least one alternate path, whether the alternate path is an active path or a fallback path;

traffic congestion of each of the at least one alternate path; and for each of the at least one alternate path, whether the alternate path is link disjoint to a path from the network node to the donor node.

Embodiment A5. The network node of any one of Embodiments A1-A4, wherein one or more of:

the information is received from at least one of the donor node and the at least one child node;

the information is received via radio resource control signaling; and the information is received as a result of a request for the information from the network node.

Embodiment B1. A method implemented in a network node, the method comprising:

receiving information indicating at least one alternate path of at least one child node to a donor node; and using the received information to perform at least one operational task.

Embodiment B2. The method of Embodiment B1, wherein the at least one operational task includes one or more of:
prioritizing traffic from each of the at least one child node;
performing backhaul failure recovery; and
performing load balancing of traffic for each of the at least one child node.

Embodiment B3. The method of any one of Embodiments B1 and B2, wherein the information indicates only the alternative paths to the donor node that do not traverse the network node.

Embodiment B4. The method of any one of Embodiments B1-B3, wherein the information indicates one or more of:
a number of alternate parent nodes;
for each of the at least one alternate path, a number of hops to reach the donor node via the alternate path;
for each of the at least one alternate path, whether the alternate path is an active path or a fallback path;
traffic congestion of each of the at least one alternate path; and
for each of the at least one alternate path, whether the alternate path is link disjoint to a path from the network node to the donor node.

Embodiment B5. The method of any one of Embodiments B1-B4, wherein one or more of:
the information is received from at least one of the donor node and the at least one child node;
the information is received via radio resource control signaling; and
the information is received as a result of a request for the information from the network node.

Embodiment C1. A network node configured to facilitate communication with a user equipment (UE), the network node configured to, and/or comprising a radio interface and/or comprising processing circuitry configured to:
receive information indicating at least one alternate path of the network node to a donor node; and
use the received information to perform at least one operational task.

Embodiment C2. The network node of Embodiment C1, wherein the information indicates one or more of:
a number of intermediate parent nodes of the network node;
alternate paths available through each intermediate parent node; and
a number of hops to reach the donor node via each of the alternate paths.

Embodiment C3. The network node of any one of Embodiments C1 and C2, wherein one or more of:
the information is received from at least one of the donor node and a parent node of the network node; and
the information is received from the parent node via broadcast signaling.

Embodiment C4. The network node of any one of Embodiments C1-C3, wherein the at least one operational task includes one or more of:
prioritizing connection establishment of a parent node having a greatest number of paths to the donor node, as compared to other parent nodes;
prioritizing connection establishment of a parent node having a least number of hops to the donor node, as compared to other parent nodes;
performing load balancing of traffic toward the parent nodes based on at least one of a number of paths and a number of hops to the donor node; and
controlling admission of child nodes based on a number of parent nodes.

Embodiment D1. A method implemented in a network node, the method comprising:
receiving information indicating at least one alternate path of the network node to a donor node; and
using the received information to perform at least one operational task.

Embodiment D2. The method of Embodiment D1, wherein the information indicates one or more of:
a number of intermediate parent nodes of the network node;
alternate paths available through each intermediate parent node; and
a number of hops to reach the donor node via each of the alternate paths.

Embodiment D3. The method of any one of Embodiments D1 and D2, wherein one or more of:
the information is received from at least one of the donor node and a parent node of the network node; and
the information is received from the parent node via broadcast signaling.

Embodiment D4. The method of any one of Embodiments D1-D3, wherein the at least one operational task includes one or more of:
prioritizing connection establishment of a parent node having a greatest number of paths to the donor node, as compared to other parent nodes;
prioritizing connection establishment of a parent node having a least number of hops to the donor node, as compared to other parent nodes;
performing load balancing of traffic toward the parent nodes based on at least one of a number of paths and a number of hops to the donor node; and
controlling admission of child nodes based on a number of parent nodes.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| ACK | Acknowledgement |
| BSR | Buffer Status Report |

-continued

| Abbreviation | Explanation |
| --- | --- |
| CN | Core Network |
| CP | Control Plane |
| CU | Central Unit |
| DL | Downlink |
| DU | Distributed Unit |
| IAB | Integrated Access Backhaul |
| MAC | Medium Access Control |
| NACK | Negative ACK |
| PDCP | Packet Data Convergence Protocol |
| PDU | Protocol Data Unit |
| RLC | Radio Link Control |
| RRC | Radio Resource Control |
| SDU | Service Data Unit |
| SIB | System Information Block |
| SR | Scheduling Request |
| UE | User Equipment |
| UL | Uplink |
| UP | User Plane |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in an Integrated Access Backhaul, IAB, node connected to at least one child IAB node and an IAB donor node, the method comprising:
    receiving information indicating at least one alternate path of the at least one child IAB node to the IAB donor node, the at least one child IAB node being a wireless backhaul node, the received information indicates only alternative paths of the at least one child IAB node to the IAB donor node that do not traverse the IAB node; and
    using the received information to perform at least one of a backhaul wireless link failure recovery and load balancing of traffic for the at least one child node.

2. The method of claim 1, wherein using the receiving information to perform the at least one of the backhaul wireless link failure recovery and the load balancing of traffic further comprises:
    using the received information to perform the backhaul wireless link failure recovery by informing the at least one child IAB node that has an alternate path to start routing all uplink data via the alternate path.

3. The method of claim 1, wherein using the receiving information to perform the at least one of the backhaul wireless link failure recovery and the load balancing of traffic further comprises:
    using the received information to perform the load balancing of traffic by at least one of prioritizing traffic from each of the at least one child IAB node and load balancing of traffic for each of the at least one child IAB node.

4. The method of claim 1, wherein the received information indicates at least one of:
    a number of alternate parent IAB nodes;
    for each of the at least one alternate path, a number of hops to reach the IAB donor node via the at least one alternate path;

for each of the at least one alternate path, whether the alternative path is one of an active path or a fallback path;
traffic congestion along each of the at least one alternate path; and
for each of the at least one alternate path, whether the alternate path is link disjoint to a path from the IAB node to the IAB donor node.

5. The method of claim 1, wherein receiving the information indicating the at least one alternate path of the at least one child IAB node to the IAB donor node further comprises one of:
receiving the information from at least one of the IAB donor node and the at least one child IAB node;
receiving the information via radio resource control signaling;
receiving the information via F1 signaling; and
receiving the information as a result of a request for the information from the IAB node.

6. A method implemented in a child Integrated Access Backhaul, IAB, node connected to a parent IAB node and an IAB donor node, the method comprising:
receiving information indicating at least one alternate path of the parent IAB node to the IAB donor node, the parent IAB node being a wireless backhaul node for the child IAB node; and
using the received information to perform at least one operational task, the at least one operational task comprises prioritizing connection establishment of the parent IAB node having a greatest number of paths to the IAB donor node, as compared to other parent IAB nodes of the child IAB node.

7. The method of claim 6, wherein the information indicates at least one of:
a number of intermediate parent IAB nodes of the parent IAB node;
alternate paths available through each intermediate parent IAB node; and
a number of hops from the parent IAB node to reach the donor IAB node via each of the at least one alternate path.

8. The method of claim 6, wherein receiving the information indicating the at least one alternate path of the parent IAB node to the IAB donor node further comprises one of:
receiving the information from at least one of the IAB donor node and the parent IAB node;
receiving the information via radio resource control signaling;
receiving the information via F1 signaling; and
receiving the information from the parent IAB node via broadcast signaling.

9. An Integrated Access Backhaul, IAB, node connected to at least one child IAB node and an IAB donor node, the IAB node comprising processing circuitry, the processing circuitry configured to cause the IAB node to:
receive information indicating at least one alternate path of the at least one child IAB node to the IAB donor node, the at least one child IAB node being a wireless backhaul node, the received information indicates only alternative paths of the at least one child IAB node to the IAB donor node that do not traverse the IAB node; and
use the received information to perform at least one of a backhaul wireless link failure recovery and load balancing of traffic for the at least one child IAB node.

10. The IAB node of claim 9, wherein the processing circuitry is further configured to cause the IAB node to use the received information to perform the at least one of the backhaul wireless link failure recovery and the load balancing of traffic by being configured to cause the IAB node to:
use the received information to perform the backhaul wireless link failure recovery by informing the at least one child IAB node that has an alternate path to start routing all uplink data via the alternate path.

11. The IAB node of claim 9, wherein the processing circuitry is further configured to cause the IAB node to use the receiving information to perform the at least one of the backhaul wireless link failure recovery and the load balancing of traffic by being configured to cause the IAB node to:
use the received information to perform the load balancing of traffic by at least one of prioritizing traffic from each of the at least one child IAB node and load balancing of traffic for each of the at least one child IAB node.

12. The IAB node of claim 9, wherein the received information indicates at least one of:
a number of alternate parent IAB nodes;
for each of the at least one alternate path, a number of hops to reach the IAB donor node via the at least one alternate path;
for each of the at least one alternate path, whether the alternative path is one of an active path or a fallback path;
traffic congestion along each of the at least one alternate path; and
for each of the at least one alternate path, whether the alternate path is link disjoint to a path from the IAB node to the IAB donor node.

13. The IAB node of claim 9, wherein the processing circuitry is further configured to receive the information indicating the at least one alternate path of the at least one child IAB node to the IAB donor node by being configured to cause the IAB node to one of:
receive the information from at least one of the IAB donor node and the at least one child IAB node;
receive the information via radio resource control signaling;
receive the information via F1 signaling; and
receive the information as a result of a request for the information from the IAB node.

14. A child Integrated Access Backhaul, IAB, node connected to a parent IAB node and an IAB donor node, the child IAB node comprising processing circuitry, the processing circuitry configured to cause the child IAB node to:
receive information indicating at least one alternate path of the parent IAB node to the IAB donor node, the parent IAB node being a wireless backhaul node for the child IAB node; and
use the received information to perform at least one operational task, the at least one operational task comprises prioritizing connection establishment of the parent IAB node having a greatest number of paths to the IAB donor node, as compared to other parent IAB nodes of the child IAB node.

15. The child IAB node of claim 14, wherein the information indicates at least one of:
a number of intermediate parent IAB nodes of the parent IAB node;
alternate paths available through each intermediate parent IAB node; and
a number of hops from the parent IAB node to reach the donor IAB node via each of the at least one alternate path.

16. The child IAB node of claim 14, wherein the processing circuitry is further configured to cause the child IAB node to receive the information indicating the at least one alternate path of the parent IAB node to the IAB donor node by being configured to cause the child IAB node to one of:
receive the information from at least one of the IAB donor node and the parent IAB node;
receive the information via radio resource control signaling;
receive the information via F1 signaling; and
receive the information from the parent IAB node via broadcast signaling.

* * * * *